United States Patent [19]

Ishito

[11] Patent Number: 5,715,490
[45] Date of Patent: Feb. 3, 1998

[54] FINDER FIELD-OF-VIEW FRAME SWITCHING MECHANISM

[75] Inventor: Fumiaki Ishito, Sakai, Japan

[73] Assignee: Minolta Co., Ltd., Osaka, Japan

[21] Appl. No.: 783,457

[22] Filed: Jan. 16, 1997

[30] Foreign Application Priority Data

Jan. 17, 1996 [JP] Japan .................................. 8-005758
Jan. 26, 1996 [JP] Japan .................................. 8-011759

[51] Int. Cl.⁶ .................................................. G03B 13/12
[52] U.S. Cl. ........................................................ 396/378
[58] Field of Search .............................. 396/378, 379, 396/377, 373, 84, 72, 435, 436, 380

[56] References Cited

U.S. PATENT DOCUMENTS

| | | |
|---|---|---|
| 4,357,102 | 11/1982 | Taren . |
| 4,652,104 | 3/1987 | Harvey . |
| 4,887,109 | 12/1989 | Fujita et al. ............. 396/379 X |
| 4,931,818 | 6/1990 | Gates ........................... 396/378 |
| 4,933,694 | 6/1990 | Gates et al. .................. 396/378 |
| 5,066,971 | 11/1991 | Kodaira . |
| 5,410,381 | 4/1995 | Kameyama et al. ........... 396/378 |
| 5,555,058 | 9/1996 | Huang et al. ................. 396/378 |

Primary Examiner—W. B. Perkey
Attorney, Agent, or Firm—Burns, Doane, Swecker & Mathis, LLP

[57] ABSTRACT

A camera is equipped with a finder having a field-of-view frame switching mechanism that is provided with, in addition to a stationary frame plate disposed in an optical path, two rotatable frame plates each of which moves in the optical pass to overlap with the stationary frame plate, to define three fields of different sizes. The stationary frame plate has a window of a standard size, one of the rotatable frame plates has a window of a classic size and the other has a window of panoramic size. Each of the fields of view is defined by a single frame plate. When the rotatable frame members are at their retracted positions, they substantially overlap with each other and are pushed by a spring in a direction to move in the optical path. Their movement is controlled by a cam member, which is moved in accordance with a user's operation to switch the size of a picture taken by the camera.

6 Claims, 22 Drawing Sheets

FINDER FIELD-OF-VIEW FRAME SWITCHING MECHANISM

BACKGROUND OF THE INVENTION

1. Field of the Invention

The present invention relates to a finder field switching mechanism for switching the field of view of the finder in accordance with various image sizes in a finder usable for cameras capable of taking pictures of a plurality of sizes.

2. Description of the Prior Art

In recent years, cameras have become widespread which are capable of taking pictures of an image size called panoramic size with a length-to-width ratio of 2:1 in addition to pictures of the standard size with a length-to-width ratio of 3:2. To support such cameras, finders have been put to practical use which are capable of switching the optical field of view within the finder in accordance with the field of view on the film plane.

As a finder capable of switching the field frame, Japanese Laid-open Patent Application H5-281596 discloses an arrangement as shown in FIG. 24 where a pair of field frame defining masks 202 are movably provided in a finder field 201 and by moving the defining masks 202 in response to the movement of a switching lever 203, a mask opening 204 is switched to a size corresponding to the size of a picture to be taken.

Japanese Laid-open Patent Application H5-34806 discloses an arrangement as shown in FIG. 25 where the camera is provided with a field mask 301 and the user performs an operation to select a field frame corresponding to a desired image size from among field frames 302, 303 and 304 of the field mask 301 to set the selected frame in a finder 305.

In the prior art arrangement shown in FIG. 24, however, large size members are necessary as the field frame defining masks 202 for defining the field frame of the finder field 201 and an area where the masks 202 are moved is necessary outside the field of view of the finder. This makes it difficult to reduce the size of the camera. In addition, the image size can be switched only between two sizes although a pair of defining masks 202 are necessary, so that the arrangement cannot be used for cameras capable of taking pictures of three or more sizes.

In the prior art arrangement shown in FIG. 25, since the field frames 302, 303 and 304 of the field mask 301 are arranged in a line, the size of the field mask 301 is inevitably large, so that it is difficult to reduce the size of the camera.

SUMMARY OF THE INVENTION

An object of the present invention is to provide a compact field frame switching mechanism which contributes to reduced size of the camera.

To achieve the above object, according to the present invention, a field-of-view frame switching mechanism comprises a stationary field-of-view frame piece disposed in an optical path, a first movable field-of-view frame piece, a second movable field-of-view frame piece, a switching cam having a cam piece and being movable in a first direction and a second direction, a first rotary lever connected to the first movable filed-of-view frame piece and having an arm engaged with the cam piece of the switching cam, and a second rotary lever connected to the second movable filed-of-view frame piece and having an arm engaged with the cam piece of the switching cam.

Here, when the switching cam is moved in the first direction, the arm of the first rotary lever is disengaged from the cam piece, so that the first rotary lever rotates to drive the first movable field-of-view frame piece to overlap with the stationary field-of-view frame piece, and when the switching cam is moved in the second direction, the arm of the second rotary lever is disengaged from the cam piece, so that the second rotary lever rotates to drive the second movable field-of-view frame piece to overlap with the stationary field-of-view frame piece.

The switching cam may be a member rotatable in opposite directions, that is, in the first and the second directions. The switching cam is rotated by another rotatable member which is rotated manually.

In the field-of-view frame switching mechanism described above, the first and second movable field-of-view frame pieces are supported by a same shaft so as to rotate coaxially, and disposed to substantially overlap with each other when the switching cam is not rotated in the first direction nor in the second direction.

Furthermore, a spring is provided that presses the first and second rotary levers in a direction in which the first and second field-of-view frame pieces are driven to overlap with the stationary field-of-view frame piece.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1A:
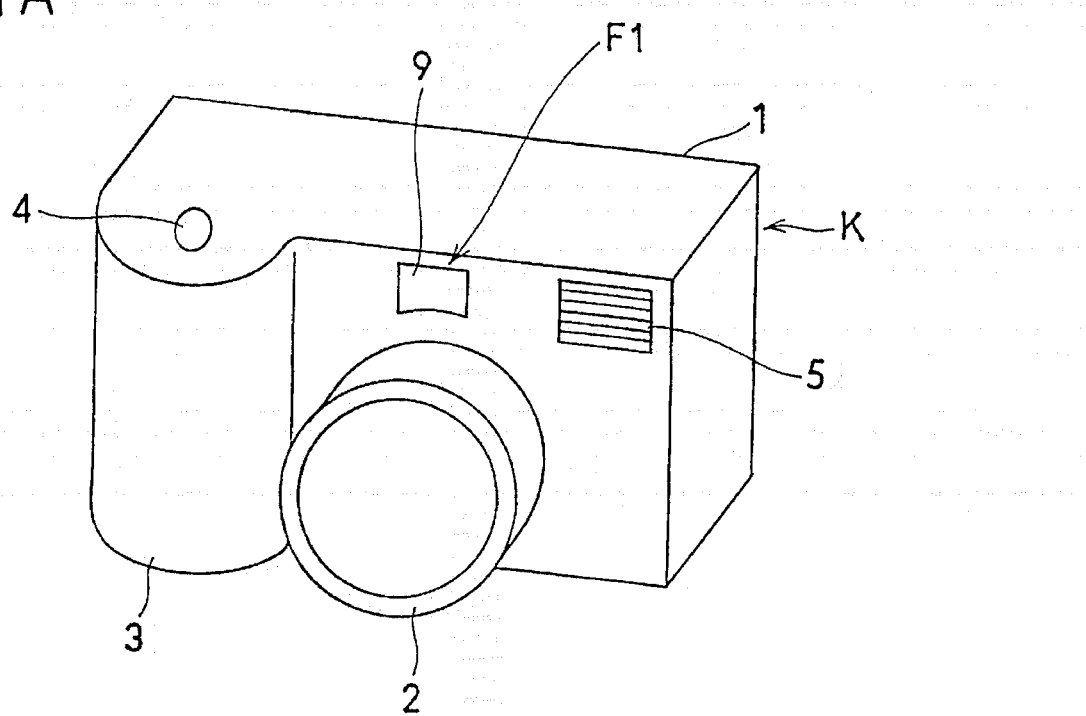
FIG. 1A is a front perspective view showing an external arrangement of a camera incorporating a finder according to a first embodiment of the present invention.
Figure 1B:
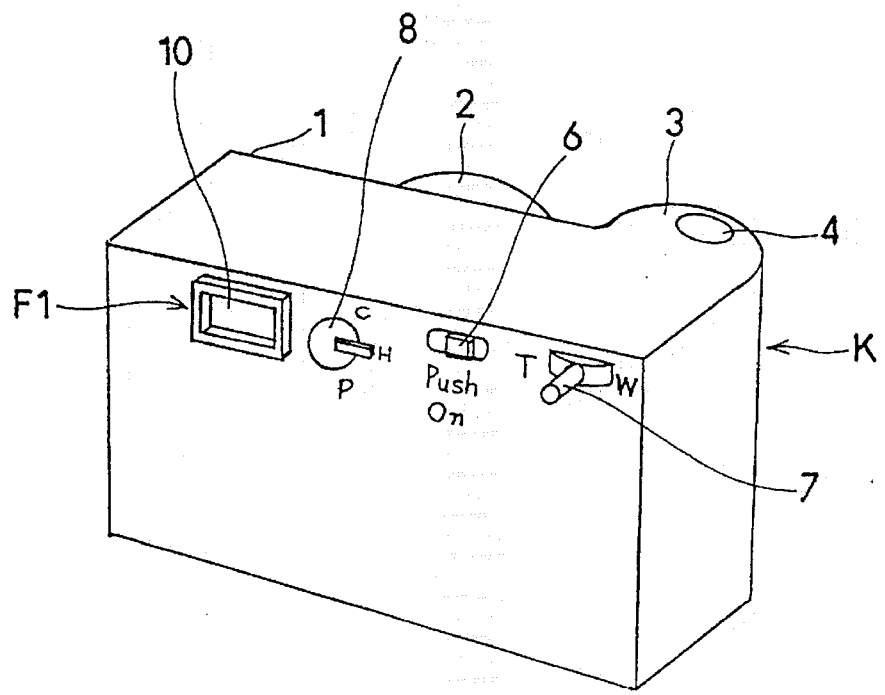
FIG. 1B is a rear perspective view showing the external arrangement of the camera incorporating the finder according to the first embodiment of the present invention.

Hereinafter, embodiments of a camera finder according to the present invention will be described with reference to the drawings. FIGS. 1 to 14 show a first embodiment of the finder according to the present invention. FIGS. 1A and 1B are external views of a camera incorporating a finder according to the first embodiment. The camera K shown in these figures is a lens shutter zoom camera having an autofocus (AF) function and an automatic exposure (AE) function.

Referring to FIG. 1A, numeral 1 represents a camera body having a taking zoom lens 2 mounted substantially in the center thereof. On one end of the body 1, a grip portion 3 is integrally formed which incorporates a film compartment and an auto rewinder (neither is shown). On an upper surface of the grip portion 3, a shutter button 4 is disposed. On the other end of the body 1, a stroboscopic flash 5 is disposed.

Referring to FIG. 1B, on the rear side of the body 1, a power switch 6, a zoom lever 7 and a field frame switching lever 8 are disposed in a line. The power switch 6, for example comprising a push button, is provided for turning on and off a power supply battery loaded in the body 1 to supply power to a driving system, a display system and a photometric system of the camera K. The zoom lever 7 is horizontally turned so that the image magnification is non-stepwisely set within a zoom range including the telephoto, standard and wide-angle conditions. The field frame switching lever 8 is stepwisely turned to select an image size from among three image sizes H, C and P.

Figure 15:
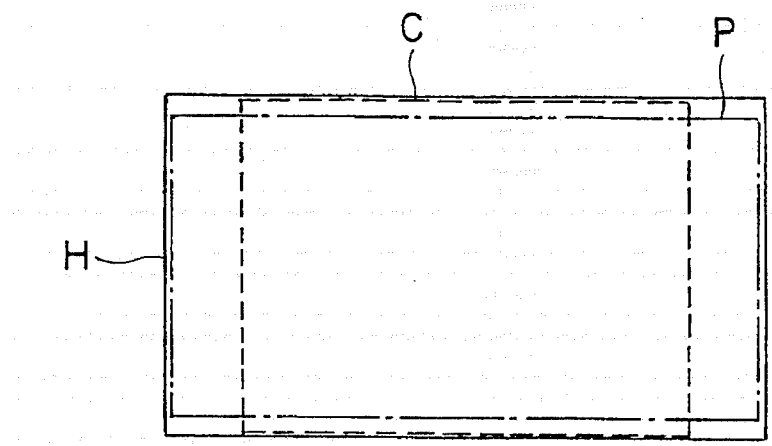
FIG. 15 schematically shows image sizes which the camera of FIG. 1 is capable of taking.

FIG. 15 schematically shows the image sizes which the camera K shown in FIGS. 1A and 1B is capable of taking. A first image size H shown by the solid line is a high vision size with a length-to-width ratio of 16:9. In this embodiment, the first image size H is the standard size and the image side is switchable to a second image size C shown by the broken line and to a third image size P shown by the dash and dotted line.

The second image size C, called classic size, has a length-to-width ratio of 3:2. The third image size P, usually called panoramic size, has a length-to-width ratio of 2:1. By turning the field frame switching lever 8 to select one of these sizes, the image taken area on the film is switched, and in response thereto, the field of view of a subsequently-described finder F1 is switched.

Reverting to FIG. 1A, an objective window 9 of the finder F1 according to this embodiment is provided above the taking zoom lens 2. By disposing the objective window 9 of the finder F1 close to the taking zoom lens 2, the difference between the field of view of the finder F1 and that of the taking zoom lens 2 is minimized.

Reverting to FIG. 1B, an ocular window 10 of the finder F1 is provided in a position shifted from the position of the objective window 9 toward the other end of the body 1. By disposing the ocular window 10 of the finder F1 in the shifted position, it is minimized that the body 1 interferes with a part of the user's face such as the nose when the user is viewing through the finder F1. In addition, since the ocular window 10 is located diagonally to the shutter button 4 disposed on the one end, the operability improves of the shutter button 4 which the user depresses while viewing through the finder.

Since the objective and ocular windows 9 and 10 of the finder F1 are largely away from each other not only along the width of the camera K but also along its length, the finder F1 is provided with an image inverting optical system for inverting a real image formed by an objective optical system and directing it to an eyepiece optical system. The objective optical system comprises a zoom optical system interlocking with the zooming of the taking zoom lens 2. Consequently, a finder image viewed by the user is substantially the same as the image formed on the film plane.

Figure 2:
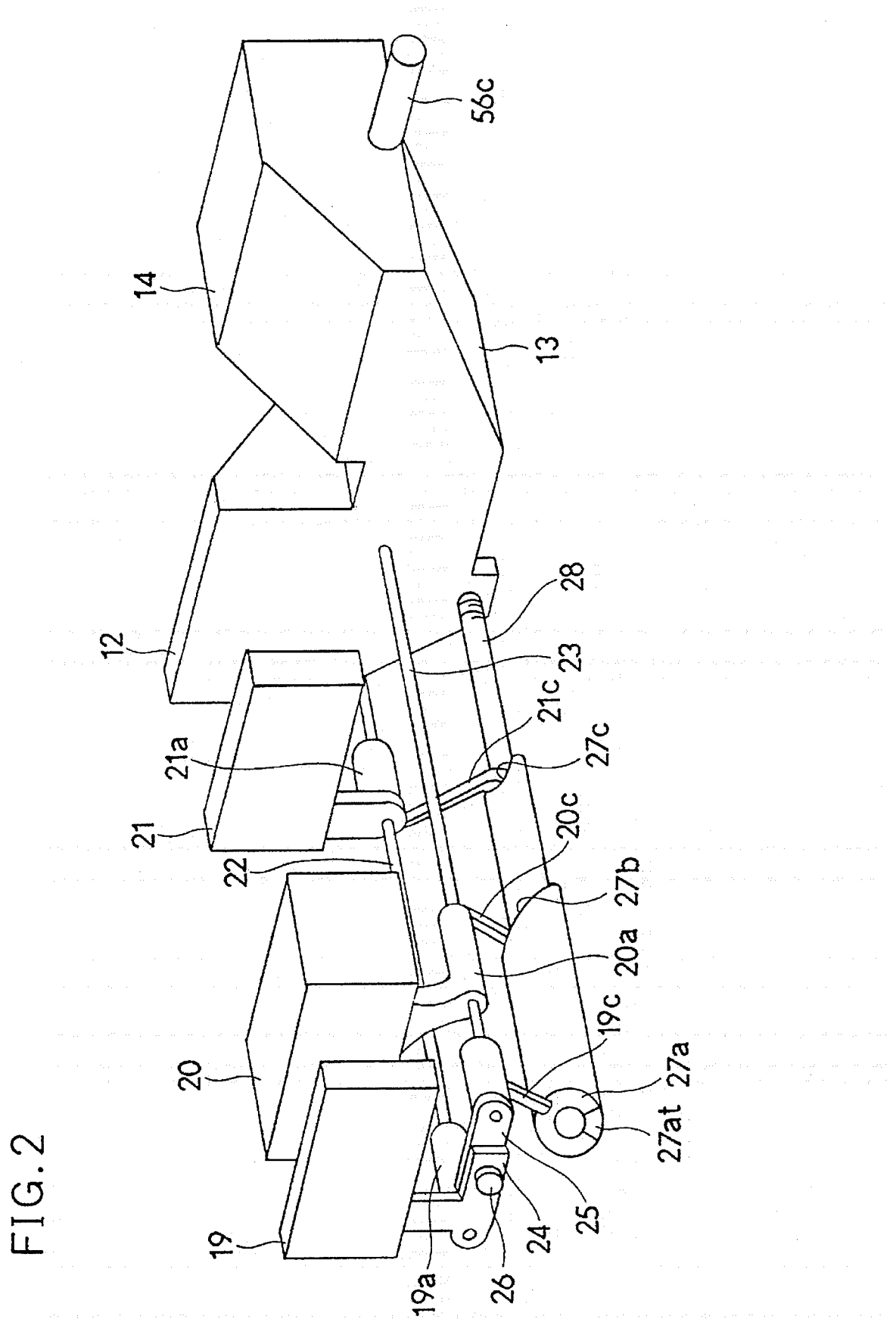
FIG. 2 is a perspective view showing an assembled condition of a finder optical system.
Figure 3:
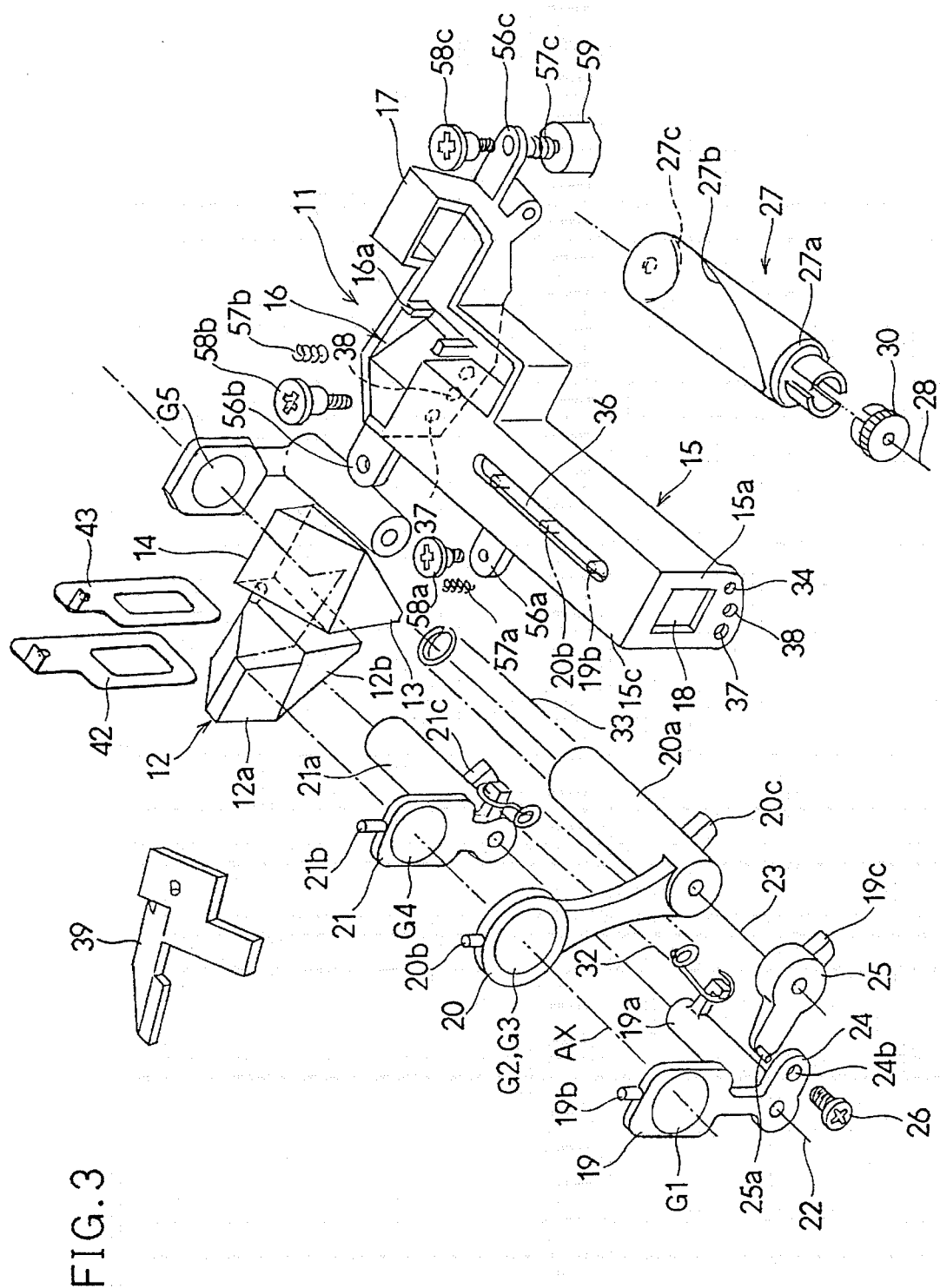
FIG. 3 is an exploded perspective view showing the entire arrangement of the finder.
Figure 4:
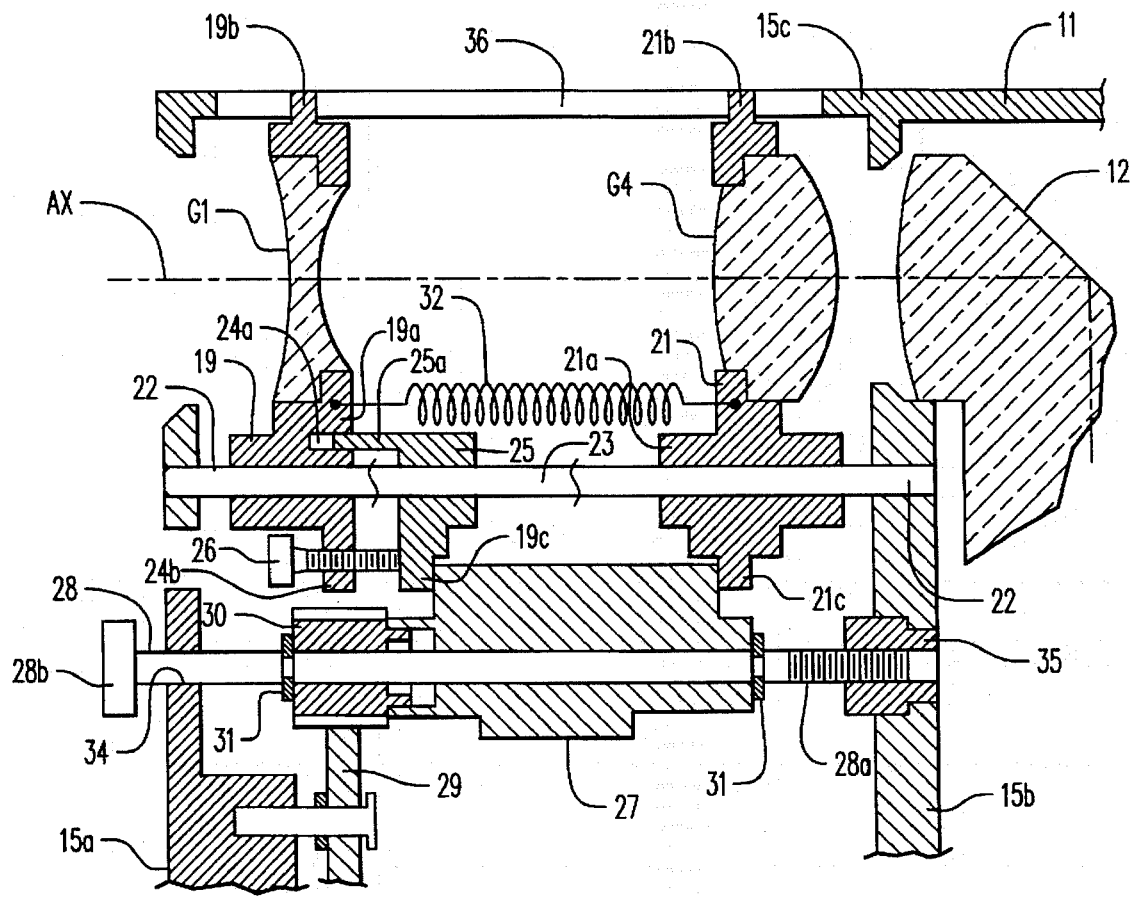
FIG. 4 is a cross-sectional view showing the assembled condition of the finder.

FIG. 2 shows the finder optical system in an assembled condition. FIG. 3 shows the finder F1 in a disassembled condition. FIG. 4 cross-sectionally shows the finder F1 in an assembled condition. As shown in these figures, the finder F1 according to this embodiment has a real image finder optical system comprising an objective optical system, an image inverting optical system and an eyepiece optical system.

Numeral 11 represents a finder case incorporating the objective optical system, the image inverting optical system and the eyepiece optical system. The objective optical system is a four unit zoom optical system comprising a first lens G1, a second lens G2, a third lens G3 and a fourth lens G4, and is provided with a high image magnification in this embodiment. The image inverting optical system comprises a Porro prism 12 and two triangular prisms 13 and 14. The eyepiece optical system comprises a single eyepiece G5.

In the finder optical system incorporated in the finder case 11, with the case 11 mounted in the body 1 of the camera K, the light incident from the objective window 9 is, as shown by an optical path AX of FIG. 3, adjusted to a given image magnification by the first to fourth lenses G1 to G4 of the objective optical system and bent downward at 90 degrees by a first prism 12a of the Porro prism 12. Then, the light is bent horizontally at 90 degrees by a second prism 12b of the Porro prism 12 and directed to the first triangular prism 13. Subsequently, the light is inverted by the second triangular prism 14 to give an upright image and directed to the eyepiece G5.

The finder case 11, which may be formed by molding a synthetic resin or by processing a metallic sheet, includes a box-shaped objective optical system holder 15 which is open at the bottom, an image inverting optical system mounting portion 16 formed in the rear of the holder 15 to be substantially perpendicular thereto, and an eyepiece mounting window frame 17 formed in the rear of the mounting portion 16 so as to face it. Numeral 18 represents a window facing the objective window 9 of the body 1. The window 18 is formed at the front of the objective optical system holder 15.

The first lens G1 included in the objective optical system is secured to a first lens holder 19. The second and third lenses G2 and G3 are secured to a second lens holder 20. The fourth lens G4 is secured to a third lens holder 21. The first to third lens holders 19 to 21 function as optical element holders and have sliding cylinders 19a, 20a and 21a integrally formed at their lower ends.

The sliding cylinders 19a and 21a of the first and third lens holders 19 and 21 are slidably fitted on a common first lens holding shaft 22 disposed along the optical path (optical axis) AX. The sliding cylinder 20a of the second lens holder 20 is slidably fitted on a second lens holding shaft 23. The first to third lens holders 19 to 21 also have locking bosses 19b, 20b and 21b formed at their upper ends to substantially vertically protrude.

The first lens holder 19 has a bracket 24 protruding from a side of the sliding cylinder 19a. With the bracket 24, a sliding cylinder member 25 is engaged to be movable along the optical axis as described later. The sliding cylinder member 25 is fitted on the second lens holding shaft 23 so as to be slidable along the optical axis. The sliding cylinder member 25 attached to the first lens holder 19 and the sliding cylinders 20a and 21a of the second and third lens holders 20 and 21 have cam followers 19c, 20c and 21c, respectively.

Numeral 27 represents a zoom cam member comprising a bar cam. The zoom cam member 27 is fitted on a cam shaft 28 disposed in parallel with the first and second lens holding shafts 22 and 23 so as to be movable along the optical axis. The zoom cam member 27 has a cam 27a for the first lens, a cam 27b for the second and third lenses and a cam 27c for the fourth lens with which the cam follower 19c of the first lens holder 19, the cam follower 20c of the second lens holder 20 and the cam follower 21c of the third lens holder 21 are in contact, respectively.

At the front end of the cam shaft 28, a cam gear 30 meshed with a drive transmitting gear 29 provided at an output of a zoom finder driving system of the camera K is fitted so as to rotate integrally with the zoom cam member 27. As shown in FIG. 4, the driving force produced by turning the zoom lever 7 is transmitted by way of the finder driving system of the camera K to the cam gear 30 to thereby perform zooming. Numeral 31 represents E rings for positioning the zoom cam member 27 and the cam gear 30 on the cam shaft 28. The cam gear 30 may be formed integrally with the zoom cam member 27 or may be formed separately therefrom.

Between the first lens holder 19 and the third lens holder 21 is provided an extension spring 32 which presses the first and third cam followers 19c and 21c against the cams 27a and 27c for the first and fourth lenses at all times. Between the sliding cylinder 20a of the second lens holder 20 and a rear wall 15b of the objective optical system holder 15 of the finder case 11 is provided a compression spring 33 which presses the second cam follower 20c against the cam 27b for the second and third lenses.

Figure 5:
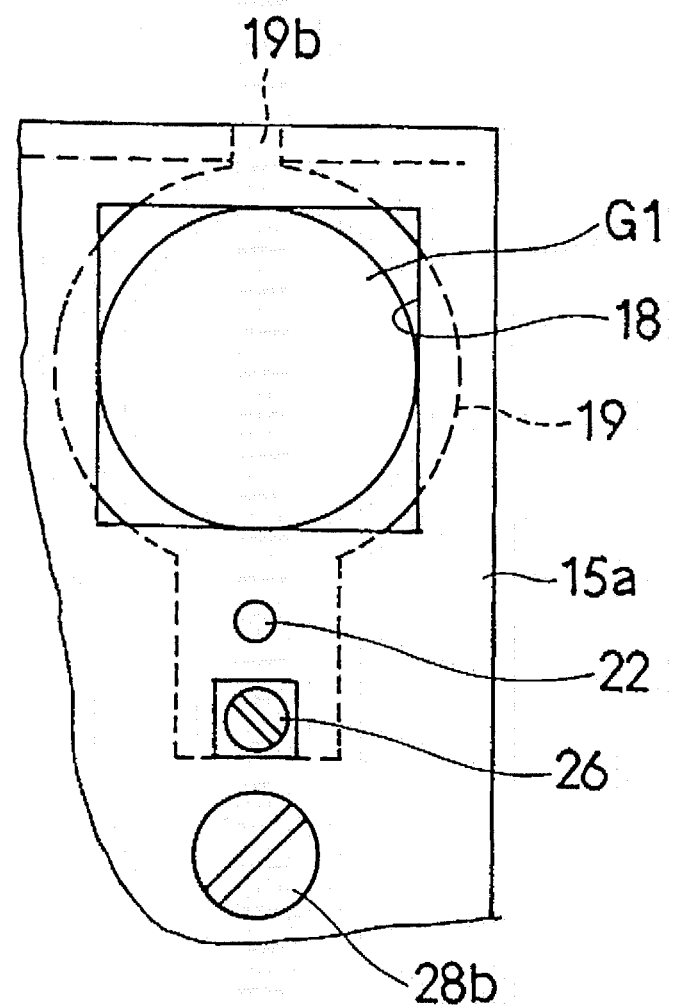
FIG. 5 is a front view of a first lens and associated parts with an objective optical system mounted in a finder case.

FIG. 5 is a front view of the first lens G1 and associated parts with the objective optical system fitted in the finder case 11. As shown in FIGS. 4 and 5, a guide shaft 25a is provided on the bracket 24 side surface of the sliding cylinder member 25. The guide shaft 25a is inserted into a shaft hole 24a of the bracket 24 so as to be slidable along the optical axis.

The bracket 24 has a screw hole 24b with which a first adjustment screw 26 is engaged so that its end abuts on the front surface of the sliding cylinder member 25. By adjusting the insertion amount of the first adjustment screw 26, fine adjustment of the axial position of the first lens G1 is made, thereby absorbing zooming errors of the objective optical system.

The cam shaft 28 has a second adjustment screw 28a formed at the rear end and a screw head 28b formed at the front end for rotating the second adjustment screw. The cam shaft 28 is inserted into a cam shaft insertion hole 34 formed in a front wall 15a of the objective optical system holder 15 of the finder case 11 and the second adjustment screw 28a is engaged with a nut 35 attached to the rear wall 15b. By rotating the screw head 28b, the cam shaft 28 is moved along the optical axis to adjust its axial position, thereby adjusting the position of the zoom cam member 27.

By providing the mechanism for adjusting the position of the cam shaft 28, dioptric power can be adjusted in the stage of assembly by displacing the axial position of the objective optical system. Specifically, the second adjustment screw 28a is provided on the cam shaft 28 so that the positions of the first and fourth lenses G1 and G4 in the entire finder optical system are adjusted by adjusting the amount of movement of the second adjustment screw 28a into or out of the nut 35 to thereby appropriately adjust the dioptric power of the entire finder optical system.

Figure 6A:
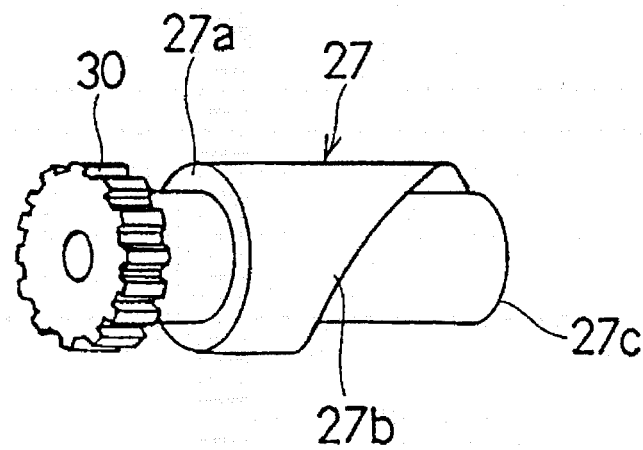
FIG. 6A is an external perspective view of a zoom cam member.
Figure 6B:
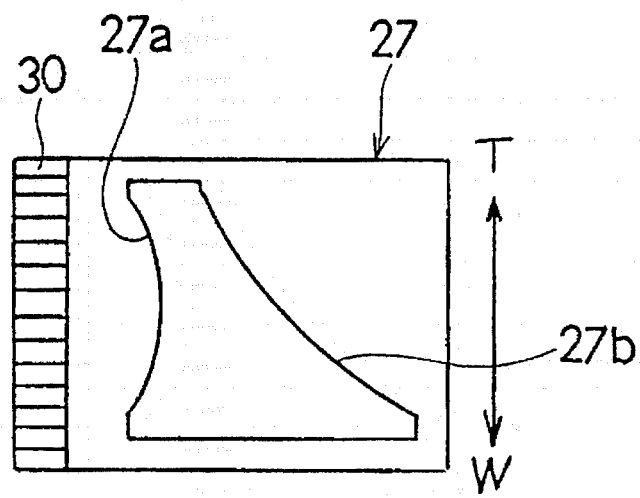
FIG. 6B is a development of the zoom cam member.

In the zoom cam member 27, as is apparent from the external view of FIG. 6A and the development of FIG. 6B, the cam 27a for the first lens is formed by use of a front step portion of a larger diameter portion of the zoom cam member 27 and the cam 27b for the second and third lenses is formed by use of a rear step portion of the larger diameter portion of the zoom cam member 27.

Figure 7:
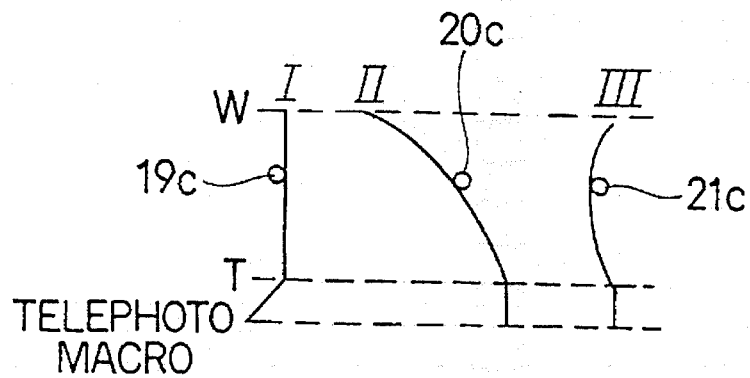
FIG. 7 shows cam curves of first to third lens cams.

FIG. 7 shows cam curves of the cams 27a to 27c for the first to fourth lenses. As shown in the figure, the first lens G1 which follows the cam 27a basically does not move as shown by a locus I. On the contrary, the second and third lenses G2 and G3 which follow the cam 27b are moved along a locus II so that the distance from the first lens G1 increases as it is moved from a wide angle condition (short focal length condition) W to a telephoto condition (long focal length condition) T. The fourth lens G4 which follows the cam 27c is moved along a locus III so that the distance to the first lens G1 is shortest at the standard focal length condition.

The objective optical system thus structured is inserted into the objective optical system holder 15 of the finder case 11 from below. The locking bosses 19b to 21b of the lens holders 19 to 21 are slidably inserted into an oblong hole 36 formed in an upper wall 15c of the objective optical system holder 15. The first lens holding shaft 22 is supported by first shaft supporting holes 37 formed in the front and rear walls 15a and 15b of the objective optical system holder 15. The second lens holding shaft 23 is supported by second shaft supporting holes 38 also formed in the front and rear walls 15a and 15b. Thus, the first to fourth lenses G1 to G4 are supported so as to be linearly slidable along the optical axis.

Figure 8:
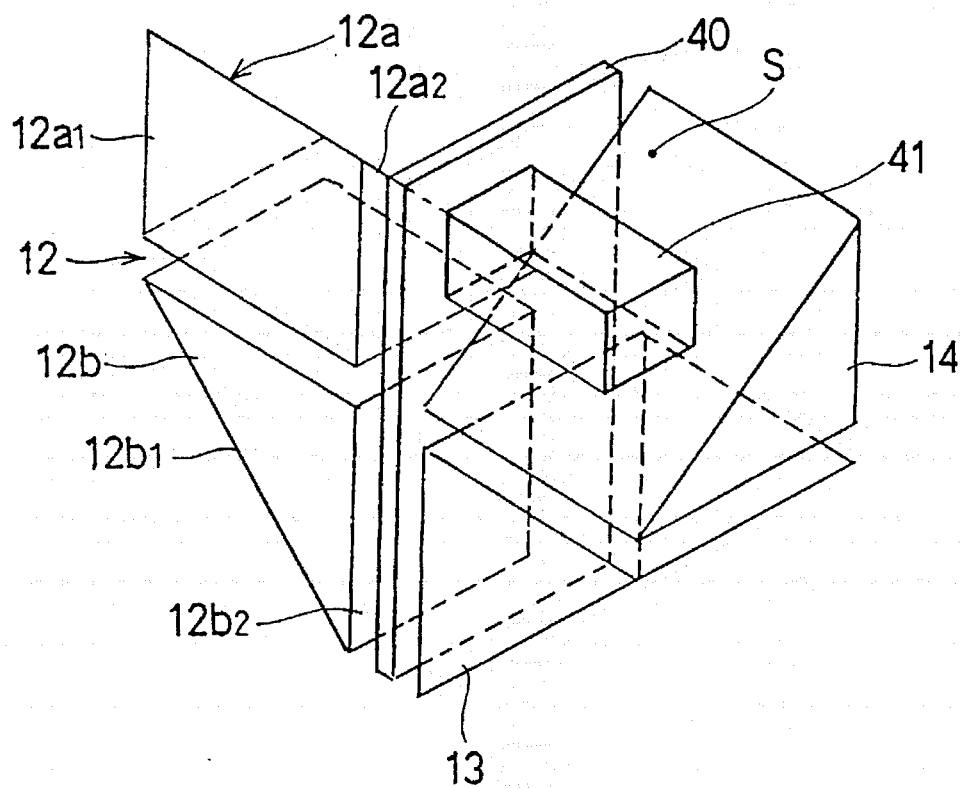
FIG. 8 is a perspective view schematically showing an arrangement of elements of an image inverting optical system.

FIG. 8 schematically shows the arrangement of elements of the image inverting optical system. As shown in FIGS. 3 and 8, the Porro prism 12 is formed by cementing the first prism 12a on the second prism 12b and is fitted on the inverting optical system mounting portion 16 of the finder case 11 from above. The first triangular prism 13 is fitted in a position opposite the second prism 12b of the Porro prism 12 with a partition 16a of the mounting portion 16 between. The second triangular prism 14 is integrally fitted on the first triangular prism 13. The eyepiece G5 is fitted in the eyepiece mounting window frame 17 and the open upper surface of the image inverting optical system mounting portion 16 is covered with a lid 39.

In the image inverting optical system incorporated in the finder case 11, the light having passed through the objective optical system is incident on a vertical surface 12a1 of the first prism 12a of the Porro prism 12, vertically refracted by a 45 degree slanting surface 12a2, horizontally refracted by a 45 degree slanting surface 12b1 of the second prism 12b, and then formed into an real image on a vertical surface 12b2 of the prism 12b. The light having passed through the surface 12b2 (hereinafter referred to as an image formed plane) is subsequently refracted twice by the first and second triangular prisms 13 and 14, the image being inverted thereby into an upright image, and directed to the user's eye through the eyepiece G5.

In the finder F1 according to this embodiment, a field frame switching mechanism for switching the field of view of the finder F1 to the first to third image sizes of FIG. 15 in response to the operation of the field frame switching lever 8 is disposed by use of a space in the image inverting optical system. That is, since the image inverting optical system mounted in the finder case 11 is an assembly of four triangle prisms grouped into two units, when set in the camera K, it occupies a rectangular solid space within the box-shaped body 1.

However, since the upper surfaces of the first prism 12a of the Porro prism 12 and the second triangular prism 14 slant at 45 degrees, a space S is left between the top surface of the body 1 and the slanting upper surfaces of the prisms 12a and 14 (see FIG. 8), whereas a driven portion 40 of the field frame switching mechanism is provided between the Porro prism 12 and the first triangular prism 13 as described later. In view of this structure, in this embodiment, a driver 41 of the field frame switching mechanism for driving the driven portion 40 is disposed by use of the space S. As a result, the size of the camera K is reduced.

Specifically, the driver 41 of the field frame switching mechanism is disposed within the space S above the second triangular prism 14. The driver 41 of the field frame switching mechanism is designed to interlock with the field frame switching lever 8. The driven portion 40 switches the field of view of the finder F1 in response to the movement of the driver 41. Reverting to FIG. 3, between the image formed plane 12b2 of the second prism 12b and the triangular prism 13, first and second field frame plates 42 and 43 constituting the driven portion 40 of the field frame switching mechanism are disposed so as to be movable in a direction perpendicular to the optical axis of the light emerging out of the Porro prism 12.

Figure 9:
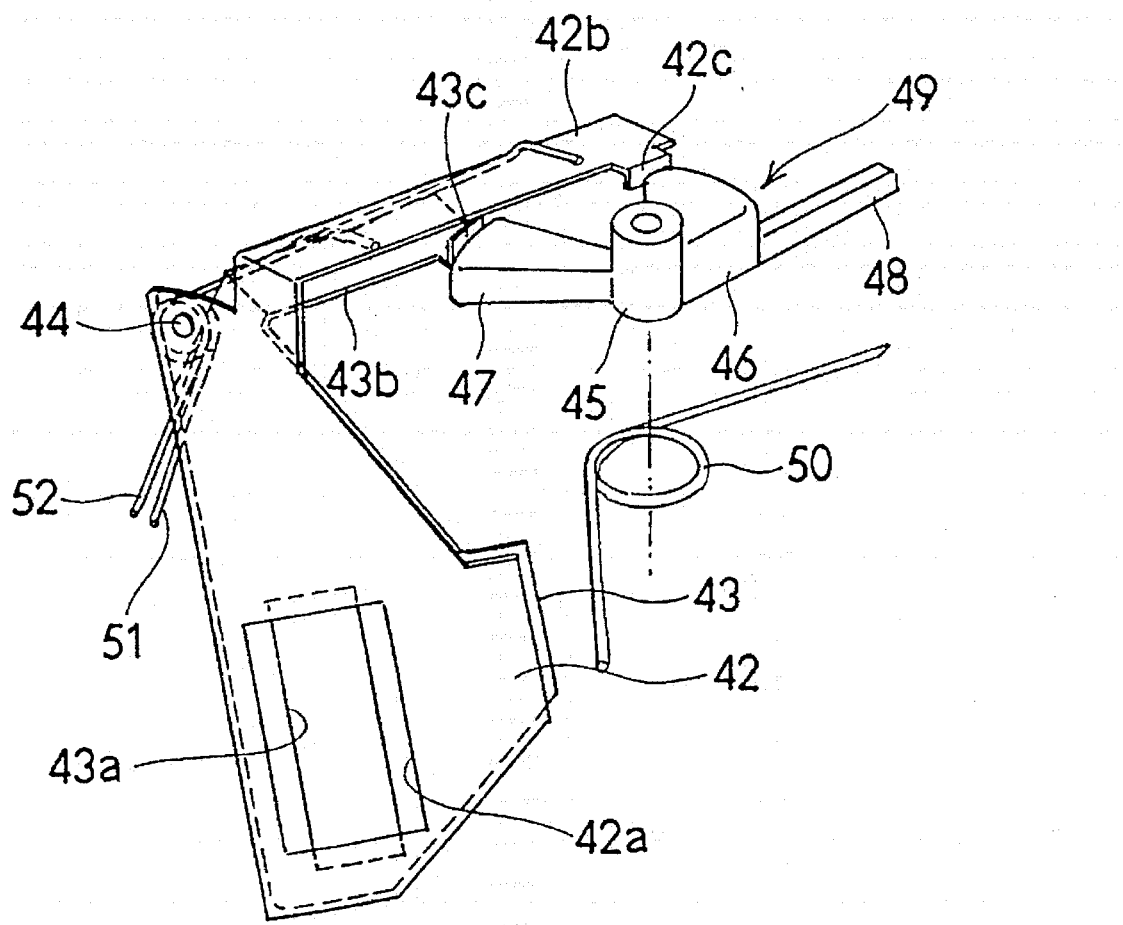
FIG. 9 is a perspective view showing a specific structure of a field frame switching mechanism.

FIG. 9 shows a specific structure of the field frame switching mechanism. The first and second field frame plates 42 and 43 are made by processing, e.g. bending, opaque plates of metal or resin. The first field frame plate 42 has a second field defining window 42a corresponding to the second image size C in its lower half and has a first arm 42b substantially perpendicularly extending from its upper end. Similarly, the second field frame plate 43 has a third field defining window 43a corresponding to the third image size P in its lower half and has a second arm 43b being shorter than the first arm 42b and substantially perpendicularly extending from its upper end.

At the ends of the first and second arms 42b and 43b, cam followers 42c and 43c are formed by bending. The first and second field frame plates 42 and 43 are supported by a common supporting shaft 44 at their upper ends so as to be rotatable in a direction substantially perpendicular to the optical axis. Since the field frames are each formed of a single plate, that is, the shape and size of the windows 42a and 43a never vary, the accuracy of the field-of-view ratio (the ratio of the field viewed by the user to the field taken on the film) improves.

The driver 41 of the field frame switching mechanism comprises a rotary cam mechanism. Specifically, the rotary cam mechanism includes a cam member 49 and a cam pushing spring 50. The cam member 49 has a vertical rotary shaft 45, first and second cam pieces 46 and 47 extending horizontally from the rotary shaft 45 and an operated arm 48 protruding from the first cam piece 46. The cam pushing spring 50 pushes the first and second cam pieces 46 and 47 of the cam member 49 at all times in a direction to cause them to be in contact with the cam followers 42c and 43c of the field frame plates 42 and 43. The operated arm 48 is rotated about the rotary shaft 45 in response to the operation of the field frame switching lever 8, so that the first and second cam pieces 46 and 47 horizontally rotate. The supporting shaft 44 and the rotary shaft 45 are supported by the finder case 11.

Between the first and second field frame plates 42 and 43 and the image inverting optical system mounting portion 16 of the finder case 11 are disposed springs 51 and 52 which push the first and second field frame plates 42 and 43 at all times in a direction to cause them to move into the field of view.

The partition 16a of the image inverting optical system mounting portion 16 has in its center a recess window 16b which forms a part of a first field defining window (not shown) corresponding to the first image size H of FIG. 15 which is the standard image size. When the image inverting optical system mounting portion 16 is covered with the lid 39, the first field defining window is formed in a position opposite the image formed plane 12b2 of the second prism 12b of the Porro prism 12 by the recess window 16b of the partition 16a and a non-illustrated partition formed on the undersurface of the lid 39.

Figure 10A:
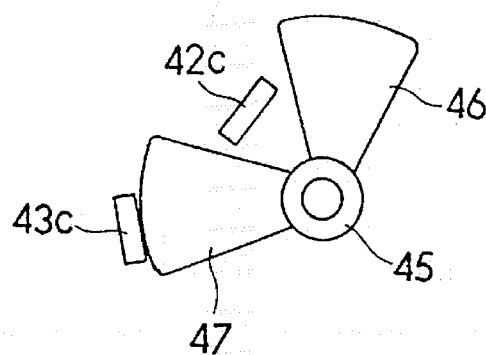
FIG. 10A shows a position of a cam member of the field frame switching mechanism in a second image size condition.
Figure 10B:
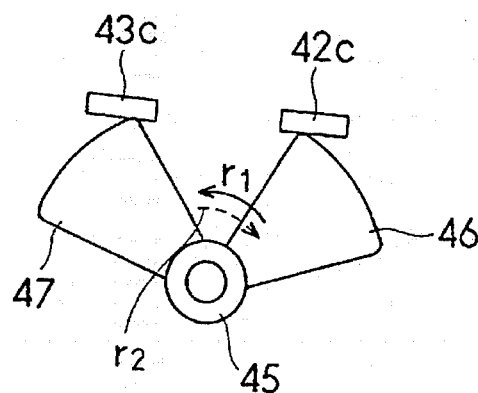
FIG. 10B shows a position of the cam member of the field frame switching mechanism in a first image size condition.
Figure 10C:
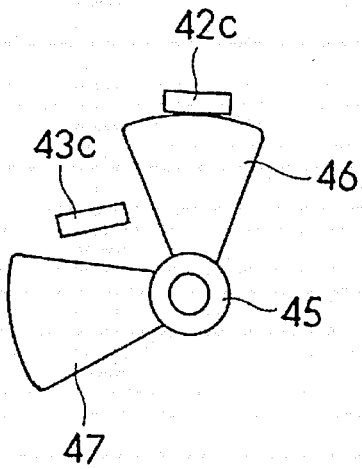
FIG. 10C shows a position of the cam member of the field frame switching mechanism in a third image size condition.

FIGS. 10A to 10C show the movement of the cam member 49 of the field switching mechanism. FIG. 10A shows a condition where the field frame switching lever 8 of FIG. 1B is set in the position of C for switching to the second image size. FIG. 10B shows a condition where the lever 8 is set in the position of H for switching to the first image size which is the standard size. FIG. 10C shows a condition where the lever 8 is set in the position of P for switching to the third image size.

In the standard size condition of FIG. 10B, cam followers 42c and 43c of the first and second field frame plates 42 and 43 are both on the cam crests of the first and second cam pieces 46 and 47 of the cam member 49, so that the first and second field frame plates 42 and 43 are retracted against the pushing force of the springs 51 and 52 to the position outside the field of view where the plates 42 and 43 overlap each other. As a result, the first field defining window is opened so that the field of view of the ocular window 10 corresponds to the first image size H.

When the field frame switching lever 8 is switched to the position of C from the condition where the first image size H which is the standard size is set, the movement of the field frame switching lever 8 is transmitted to the operated arm 48 to rotate the cam member 49 about the rotary shaft 45 in a first direction shown by the solid arrow r1 of FIG. 10B. Then, as shown in FIG. 10A, only the cam follower 42c of the first field frame plate 42 is separated from the cam crest of the first cam piece 46 and the first field frame plate 42 is rotated into the field of view by the pushing force of the spring 51, so that the second field defining window 42a overlaps the first field defining window. As a result, the field of view of the ocular window 10 corresponds to the second image size C.

When the field frame switching lever 8 is switched to the position of P from the condition where the first image size H is set, the movement of the field frame switching lever 8 is transmitted to the operated arm 48 to rotate the cam member 49 in a second direction shown by the broken arrow r2 of FIG. 10B. Then, as shown in FIG. 10C, only the cam follower 43c of the second field frame plate 43 is separated from the cam crest of the second cam piece 47 and the second field frame plate 43 is rotated into the field of view by the pushing force of the spring 52, so that the third field defining window 43a overlaps the first field defining window. As a result, the field of view of the ocular window 10 corresponds to the third image size P.

Thus, in the field frame switching mechanism according to this embodiment, since the directions in which the first and second field frame plates 42 and 43 are moved into the field of view are the same, the directions in which they are retracted from the field of view positions to set the standard size are also the same, so that the space for retracting them is reduced. Moreover, since the pushing direction of the springs 51 and 52 is the same as the direction in which the plates 42 and 43 are moved into the field of view, the position shift of the plates 42 and 43 in the field of view can be completely prevented by simply providing a stopper means in an appropriate position.

Figure 11:
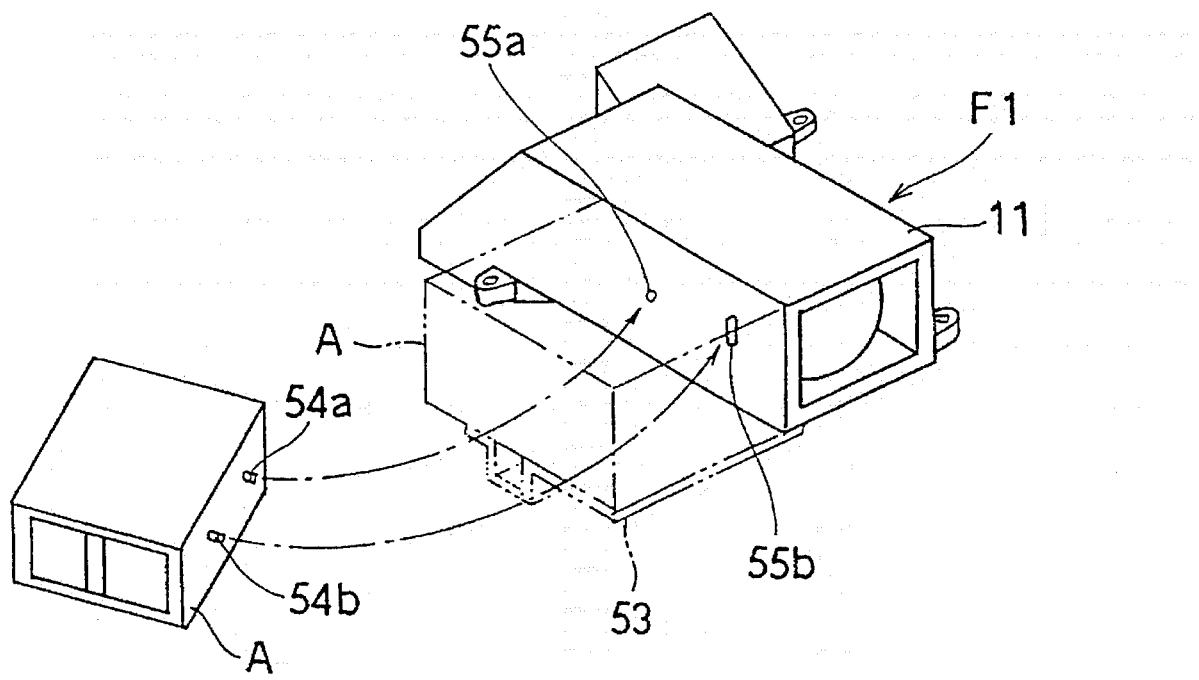
FIG. 11 is a perspective view showing an attachment structure of an AF module to the finder.

As shown in FIG. 11, in this embodiment, to the finder F1 is attached an AF module A, which is also formed separately from the body 1, and their relative position is adjustable. The finder F1 and the AF module A are supported by the body 1 as one unit so that the unit is adjustable with respect to the body 1.

Specifically, an AF module mounting guide plate 53 is attached to the undersurface of the finder F1 and the AF module A is held on the guide plate 53. On the finder side surface of the AF module A, attachment pins 54a and 54b are provided. On the side of the finder case 11, a pin hole 55a and an oblong pin hole 55b are formed.

To attach the AF module A to the finder F1, the attachment pin 54a is inserted into the pin hole 55a and the other attachment pin 54b is inserted into the oblong pin hole 55b so as to be vertically movable within the oblong pin hole 55b with the pin 54a as the fulcrum. Then, in order that the field of view of the finder F1 coincide with the distance measurement range of the AF module A, the vertical position of the attachment pin 54b is adjusted within the pin attachment oblong hole 55b and the pin 54b is fixed in a position where they coincide by a known method such as inserting a spacer between the attachment guide plate 53 and the AF module A.

After the AF module A is attached as described above, the finder F1 is mounted in the body 1 of the camera K. Reverting to FIG. 3, the finder case 11 has three horizontally protruding supporting brackets 56a to 56c, two at front and rear positions on the left side and one at the rear end on the right side. To mount the finder F1 and the AF module A in the body 1, the supporting brackets 56a to 56c are positioned with respect to a screw hole 59 formed in the body 1, and are fixed by screws 58a to 58c with compression springs 57a to 57c between.

In the screwing, the insertion amounts of the screws 58a to 58c are adjusted so that the position of the finder F1 relative to the body 1 is appropriately held by the pushing force of the compression springs 57a to 57c. Consequently, the finder F1 and the AF module A are three-point supported in an appropriate position of the body 1 without any errors while the positional relationship therebetween is appropriately held. While the three-point support is the best way to support the finder F1 in that the adjustment is easy, other methods than the three-point support may be used to mount the finder F1 in the body 1.

Reverting to FIG. 2, in the cam 27a for the first lens of the zoom cam member 27, a cam portion 27at may be set to advance the first lens G1 when telephoto macro photography in which a close-up of an object is taken with a long focal length is performed. The cam portion 27at expands the zooming range of the objective optical system to a telephoto macro range. In the telephoto macro range, the moving-out amount of the first lens G1 is large as shown by the cam curve of FIG. 7, so that focusing compensation is necessary.

Figure 12:
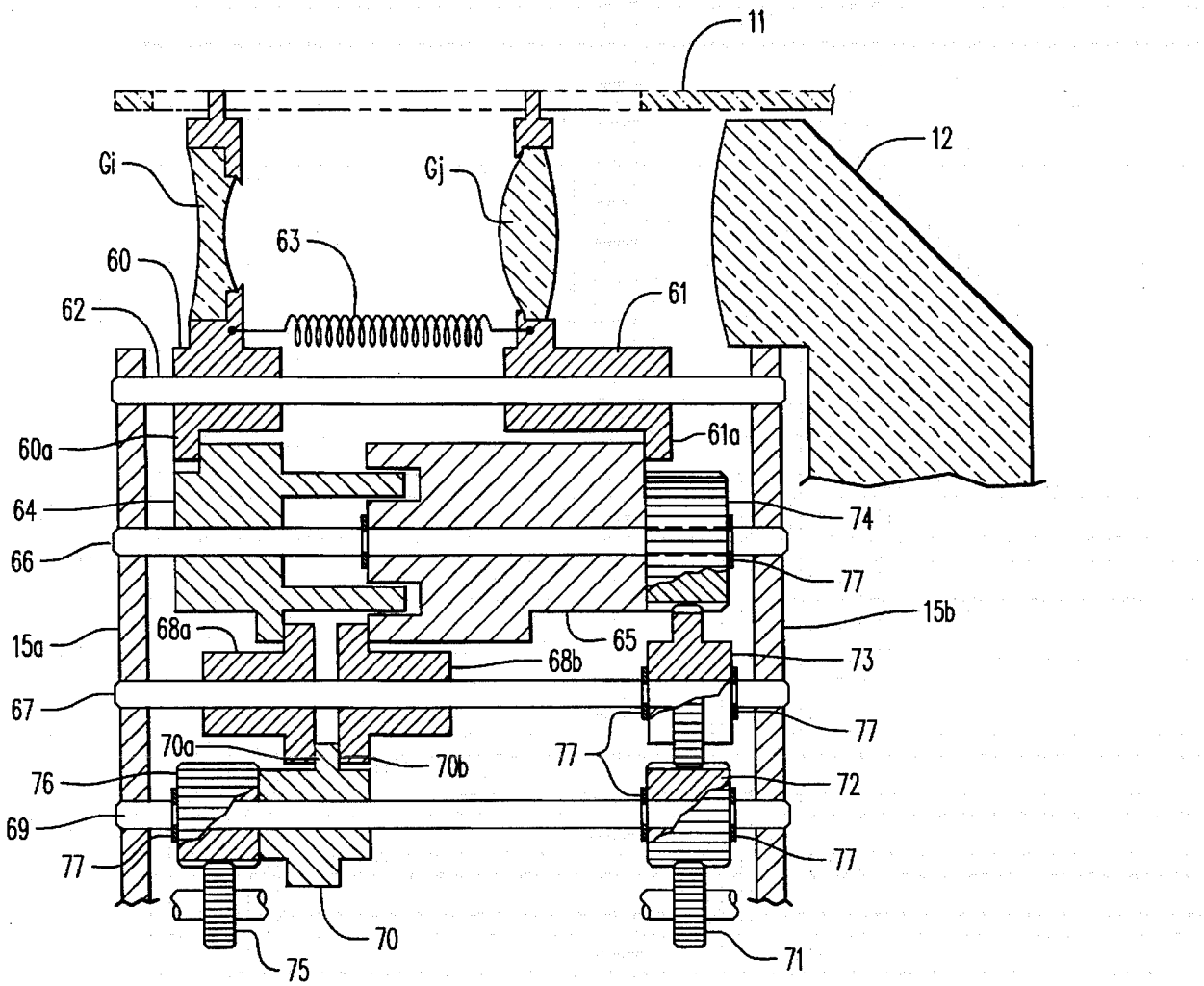
FIG. 12 is a cross-sectional assembly view showing an example of a dioptric power adjustment mechanism which realizes focusing in the entire range including a telephoto macro range.
Figure 13:
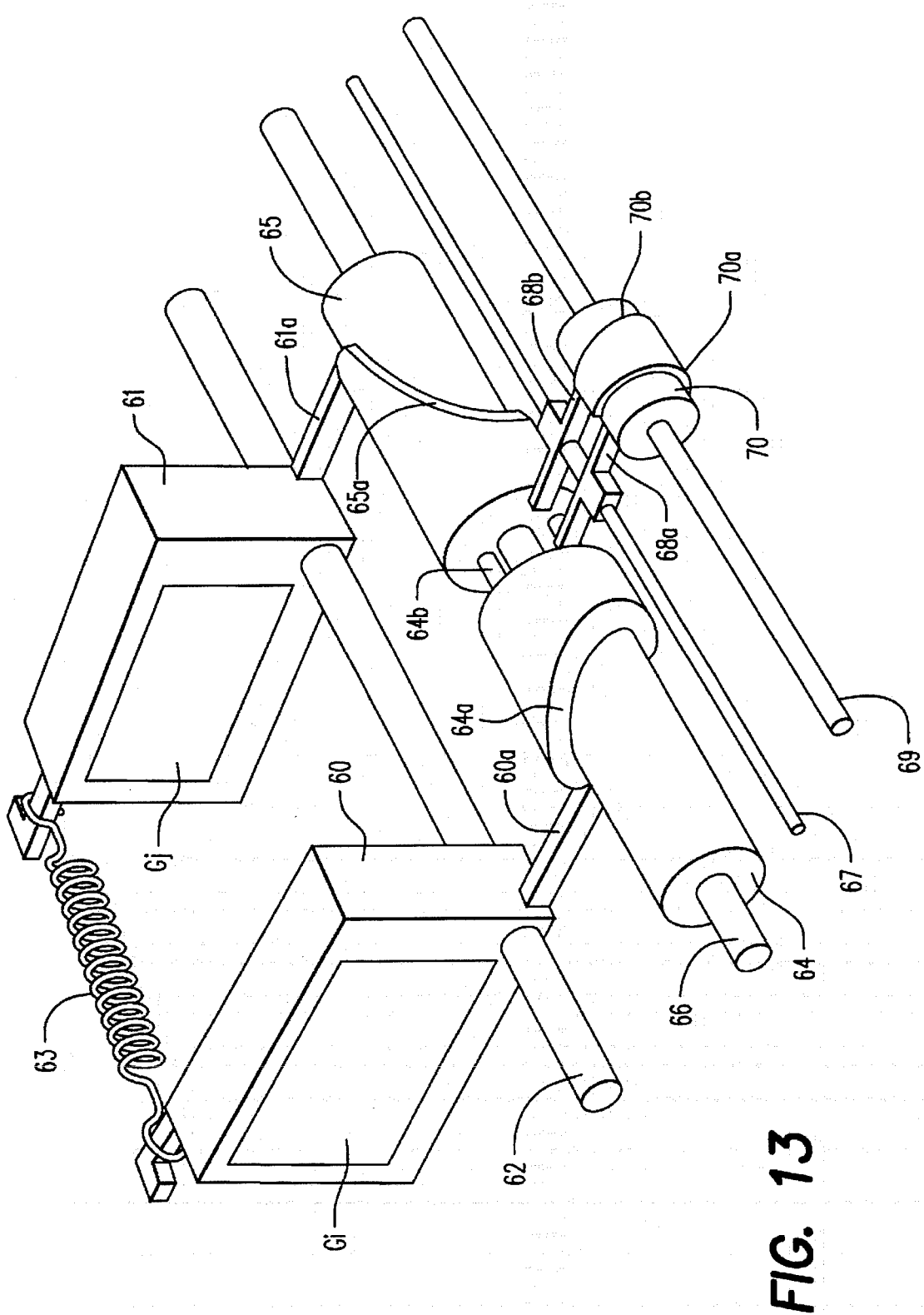
FIG. 13 is a perspective assembly view of the dioptric power adjustment mechanism.
Figure 14:
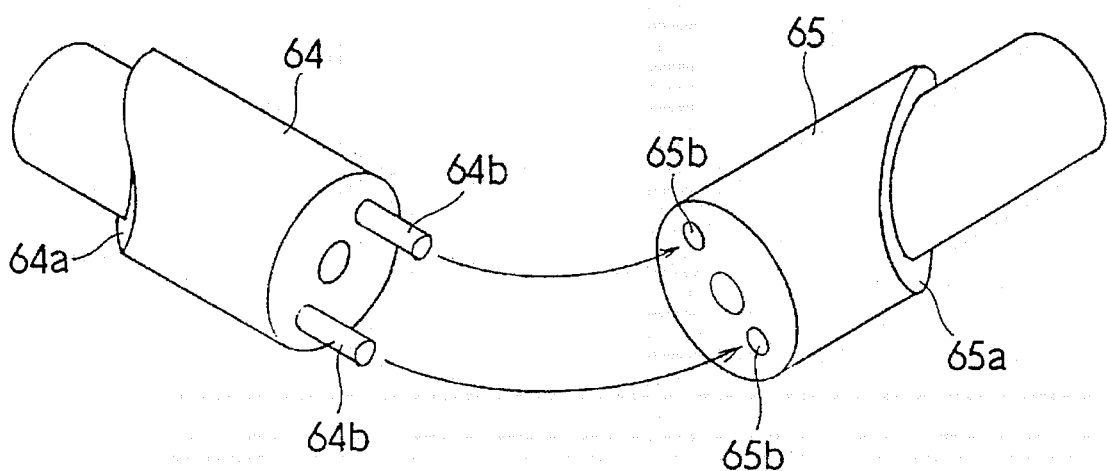
FIG. 14 is an exploded perspective view of first and second zoom cam members.

FIGS. 12 to 14 show an example of a dioptric power adjustment mechanism which realizes focusing in the entire range including the telephoto macro range. A lens holder 60 of a first lens Gi included in the objective zoom optical system and a lens holder 61 of a second lens Gj are slidably fitted on a common lens supporting shaft 62. Between the lens holders 60 and 61 is provided an extension spring 63 which presses first and second cam followers 60a and 61a against cams 64a and 65a for the first and second lenses at all times.

The cam 64a for the first lens and the cam 65a for the second lens are formed on a first zoom cam member 64 and on a second lens cam member 65, respectively. The zoom cam members 64 and 65 are fitted on a common cam shaft 66 disposed in parallel with the lens supporting shaft 62, so as to be movable together along the optical axis, and as shown in FIG. 14, guide pins 64b protruding from the first zoom cam member 64 are slidably engaged with guide holes 65b formed in the second zoom cam member 65.

At a side of the lens supporting shaft 62, a connecting lever supporting shaft 67 in parallel therewith is rotatably supported by the finder case 11. On the supporting shaft 67, first and second cam followers 68a and 68b for dioptric power correction are slidably fitted. At a side of the connecting lever supporting shaft 67, a dioptric power correcting cam shaft 69 in parallel therewith is rotatably supported by the finder case 11. On the supporting shaft 69, a dioptric power correcting cam member 70 is fitted so as to rotate integrally therewith.

The first cam follower 68a for dioptric power correction abuts on an end surface of the first zoom cam member 64 and on a first cam 70a of the dioptric power correcting cam member 70. The second cam follower 68b for dioptric power correction abuts on an end surface of the second zoom cam member 65 which is opposite the end surface of the first zoom cam member 64 and on a second cam 70b of the dioptric power correcting cam member 70.

At an end of the dioptric power correcting cam shaft 69, a cam gear 72 meshed with a drive transmitting gear 71 provided at an output of the zoom finder driving system of the camera K is fitted so as to rotate integrally with the dioptric power correcting cam member 70. On the connecting lever supporting shaft 67, an intermediate gear 73 meshed with the drive transmitting gear 71 is fitted so as to rotate integrally with the first and second cam followers 68a and 68b for dioptric power correction. On the cam shaft 66, a zoom gear 74 meshed with the intermediate gear 73 is fitted so as to rotate integrally with the first and second zoom cam members 64 and 65. The driving force produced by turning the zoom lever 7 is transmitted by way of the finder driving system of the camera K, the drive transmitting gear 71, the cam gear 72 and the intermediate gear 73 to the zoom gear 74 to thereby perform zooming of the finder.

At the other end of the dioptric power correcting cam shaft 69, a cam gear 76 meshed with a drive transmitting gear 75 provided at an output of a focusing driving system of the camera K is fitted so as to rotate integrally with the dioptric power correcting cam shaft 69. The rotation driving force of the focusing driving system of the camera K is transmitted by way of the drive transmitting gear 75 to the cam pear 76. Numeral 77 represents C rings for positioning the above-mentioned gears on the respective shafts.

The dioptric power adjustment mechanism thus structured has provision for the entire focusing range including the telephoto macro range. Specifically, while in the normal zoom range, the first and second zoom cam members 64 and 65 are fixed with an appropriate distance between, in the telephoto macro range, the drive transmitting gear 75 rotates based on distance measurement data from the AF module A or in response to a manual operation of a focusing ring, and in accordance with the movement of the dioptric power correcting cam member 70 which follows the rotation of the gear 75, the first and second cam followers 68a and 68b for dioptric power correction move so as to increase or decrease the distance between the first and second zoom cam members 64 and 65 by an amount corresponding to the focusing at that time, thereby correcting the moving-out amount of the first lens Gi.

While in the configuration shown in FIGS. 12 to 14, the dioptric power correcting cam member 70 fitted on the dioptric power correcting cam shaft 69 is used both as a cam mechanism for driving the objective optical system during focusing and as an additional cam mechanism for driving the cam mechanism for driving the objective optical system during zooming, these cam mechanisms may be separately provided.

FIGS. 16 to 23 show a second embodiment of the finder according to the present invention. Similarly to the finder F1 of the above-described first embodiment, a finder F2 according to this embodiment is a real image finder optical system including an objective optical system comprising a zoom optical system, an image inverting optical system and an eyepiece optical system. However, the image magnification of the objective optical system is lower than that of the first embodiment. The finder F2 may be incorporated in a lens shutter zoom camera similar to the camera K shown in FIG. 1.

The finder F2 incorporates an image inverting optical system for inverting the real image formed by the objective optical system to direct it to the eyepiece optical system. The objective optical system comprises a zoom optical system interlocking with the zooming of the taking zoom lens 2. Consequently, a finder image viewed by the user is substantially the same as the image formed on the film plane.

The finder F2 provided with the real image finder optical system including the objective optical system, the image inverting optical system and the eyepiece optical system is a unit formed separately from the body 1 of the camera K. To the unit is attached an AF module A which also formed separately from the body 1, and their relative position is adjustable. The finder and the AF module A are supported integrally by the body 1 so that they are adjusted together with respect to the body 1.

Figure 16:
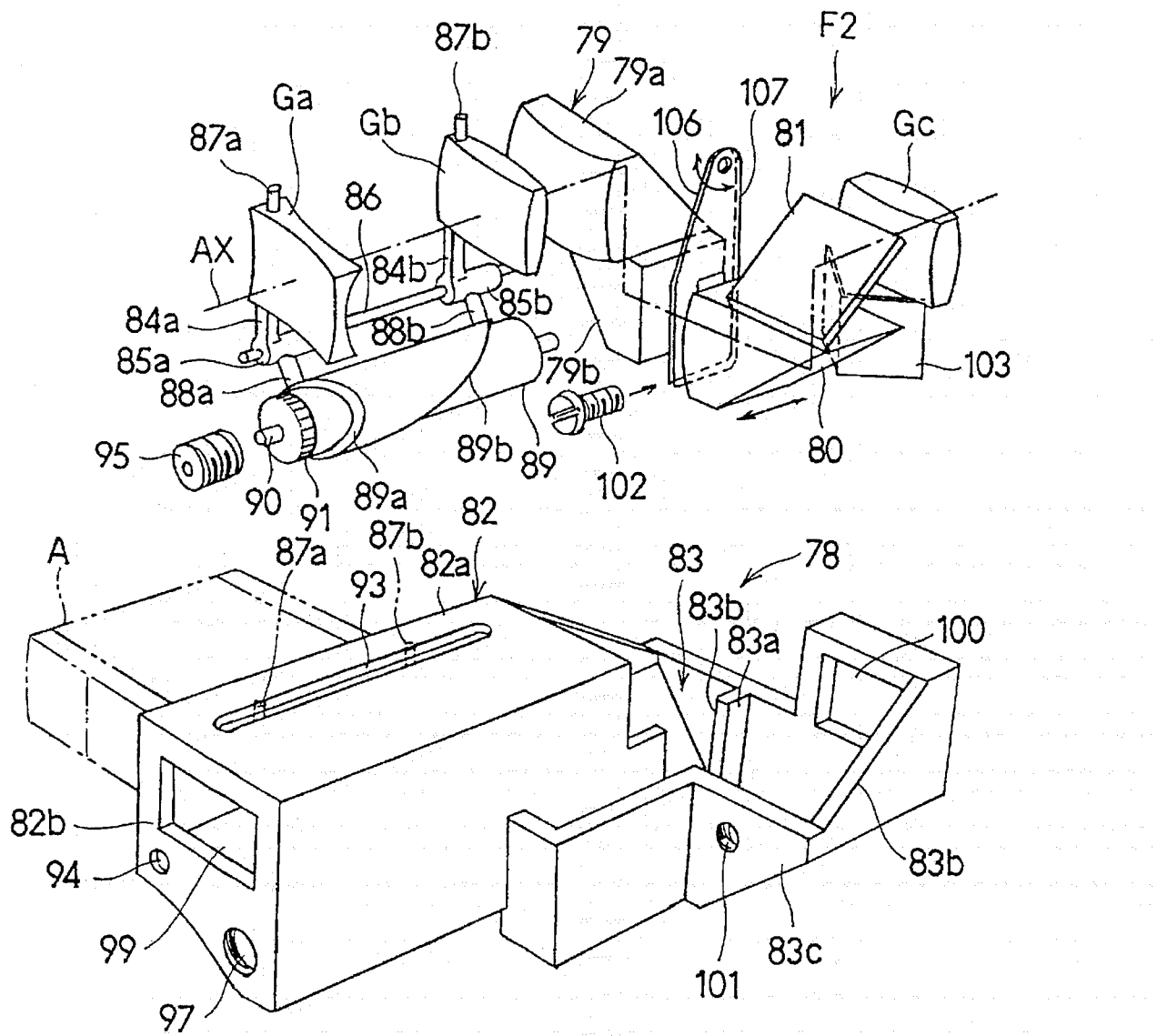
FIG. 16 is an exploded perspective view showing the entire arrangement of a finder according to a second embodiment of the present invention.

FIG. 16 is an exploded view of the finder F2. Numeral 78 represents a finder case incorporating the objective optical system, the image inverting optical system and the eyepiece optical system. The objective optical system is a two unit zoom optical system comprising a first lens Ga and a second lens Gb and has an image magnification of approximately 2.5x to 3.0x. The image inverting optical system comprises a Porro prism 79, a triangular prism 80 and a mirror 81. The eyepiece optical system comprises a single eyepiece Gc.

In the finder optical system incorporated in the finder case 78, with the case 78 mounted in the body 1, the light incident from the objective window 9 is, as shown by the optical axis AX of FIG. 16, adjusted to a given image magnification through the first and second lenses Ga and Gb of the objective optical system and bent downward at 90 degrees by a first prism 79a of the Porro prism 79. Then, the light is bent horizontally at 90 degrees by a second prism 79b of the Porro prism 79 and directed to the triangular prism 80. Subsequently, the light is inverted by the mirror 81 to give an upright image and directed to the eyepiece Gc.

The finder case 78, which may be formed by molding a synthetic resin or by processing a metallic sheet, includes a box-shaped objective optical system holder 82 which is open at the bottom, and an image inverting optical system mounting portion 83 formed in the rear of the holder 82 to be substantially perpendicular thereto as shown in FIG. 16.

Figure 17:
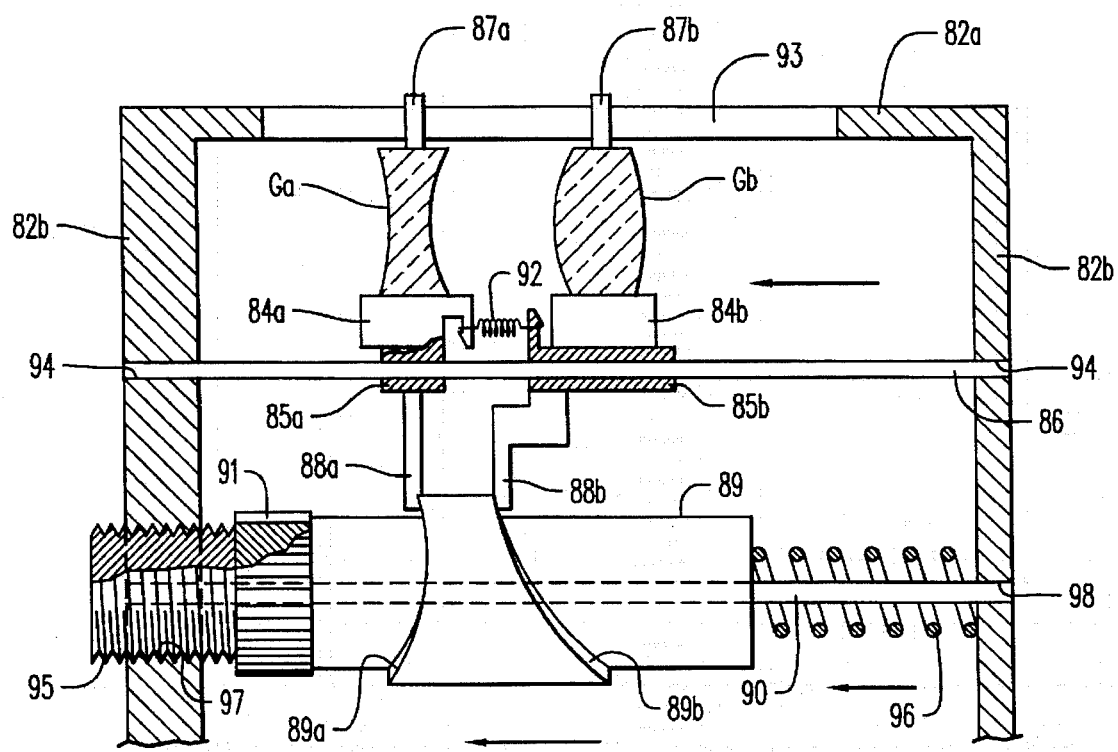
FIG. 17 is a cross-sectional view showing an assembled condition of the finder.

FIG. 17 shows the objective optical system and a cam mechanism for driving it. As shown in the figure, the first lens Ga included in the objective optical system is secured to a first lens holder 84a and the second lens Gb is secured to a second lens holder 84b. At lower ends of the lens holders 84a and 84b are formed sliding cylinders 85a and 85b which are slidably fitted on a common lens supporting shaft 86. At upper ends of the first and second lens holders 84a and 84b, locking bosses 87a and 87b are formed to substantially vertically protrude.

On the sliding cylinder 85a of the first lens holder 84a and on the sliding cylinder 85b of the second lens holder 84b, a first cam follower 88a and a second cam follower 88b are integrally formed, respectively. Numeral 89 represents a zoom cam member comprising a bar cam. The zoom cam member 89 is fitted on a cam shaft 90 disposed in parallel with the lens supporting shaft 86. On the periphery of the zoom cam member 89 are formed a cam 89a for the first lens and a cam 89b for the second lens on which the first cam follower 88a and the second cam follower 88b abut, respectively.

At the front end of the cam shaft 90, a cam gear 91 for interlock with the driving system of the camera K is fitted so as to rotate coaxially and integrally with the zoom cam member 89, so that the driving force produced by a motor incorporated in the camera K or by turning the zoom lever 7 is transmitted by way of the driving system of the camera K and the cam gear 91 to the zoom cam member 89. The cam gear 91 may be formed integrally with the zoom cam member 89 or may be formed separately therefrom. Moreover, the cam gear 91 may be interlocked with an operation driving system so as to be manually rotated. Numeral 92 represents an extension spring provided between the first and second lens holders 84a and 84b. By the extension spring 92, the first and second cam followers 88a and 88b are pressed against the cams 89a and 89b for the first and second lenses in correct positions.

The objective optical system thus structured is inserted into the objective optical system holder 82 from below. The locking bosses 87a and 87b of the lens holders 84a and 84b are slidably inserted into an oblong hole 93 formed in an upper wall 82a of the objective optical system holder 82 and the lens supporting shaft 86 is supported by shaft supporting holes 94 formed in front and rear side walls 82b of the objective optical system holder 82, so that the first and second lenses Ga and Gb are linearly movable backward and forward.

The cam shaft 90, with a cam positioning screw 95 fitted at its front end and with a cam positioning compression spring 96 provided at its rear end, is supported by a screw hole 97 and a supporting hole 98 formed in the side walls 82b of the objective optical system holder 82. By thus mounting the objective optical system in the holder 82, the cam positioning compression spring 96 pushes the rear side wall 82b of the objective optical system holder 82 and the rear end surface of the zoom cam member 89 so that the zoom cam member 89 is pressed against the cam positioning screw 95 with the cam gear 91 between.

With this arrangement, the dioptric power of the entire finder optical system is appropriately adjusted in the stage of assembly by adjusting the insertion amount of the cam positioning screw 95 into the screw hole 97 to adjust the positions of the first and second lenses Ga and Gb in the entire finder optical system. In order to adjust the dioptric power of the finder optical system, the position of one of the lenses included in the optical system is corrected. However, in this embodiment, the position of the entire cam shaft 90 along the optical axis is adjusted to adjust the positions of the first and second lenses Ga and Gb and this adjustment is made by moving in or out the cam positioning screw 95. As a result, accurate dioptric power adjustment is realized with a simple mechanism. Numeral 99 represents a window facing the objective window 9 of the body 1.

Figure 18:
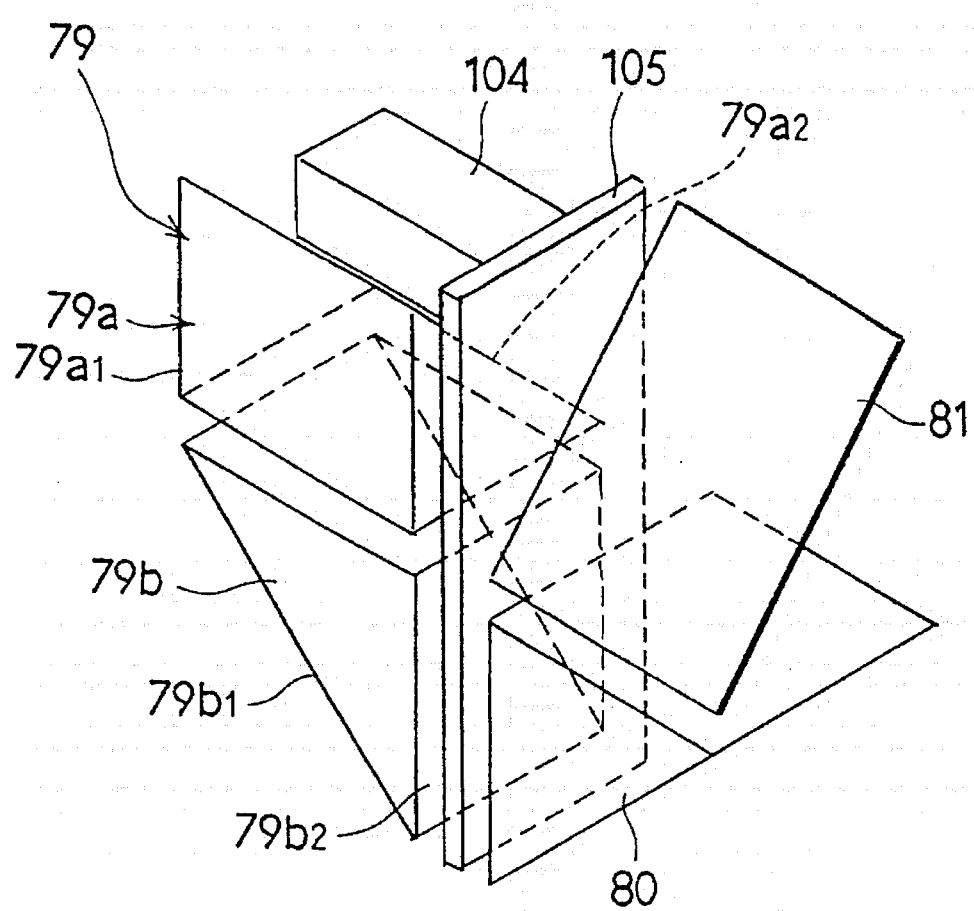
FIG. 18 is a perspective view schematically showing a structure of an image inverting optical system.

FIG. 18 schematically shows the arrangement of elements of the image inverting optical system. As shown in FIGS. 16 and 18, the Porro prism 79 is formed by cementing the first prism 79a on the second prism 79b and is fitted in the inverting optical system mounting portion 83 of the finder case 78 from above. The triangular prism 80 is fitted in a position opposite the second prism 79b of the Porro prism 79 with a partition 83a of the mounting portion 83 between. The mirror 81 is secured along a slanting upper surface of a slanting wall 83b formed at a right end of the image inverting optical system mounting portion 83. The eyepiece Gc is fitted in an eyepiece mounting window 100 formed at an end of the finder case 78 in a position which faces the mirror 81.

In the image inverting optical system incorporated in the finder case 78, the light having passed through the objective optical system is incident on a vertical surface 79a1 of the first prism 79a of the Porro prism 79, vertically refracted by a 45 degree slanting surface 79a2, horizontally refracted by a 45 degree slanting surface 79b1 of the second prism 79b, and then formed into an real image on a vertical surface 79b2 of the prism 79b. The light having passed through the surface 79b2 (hereinafter referred to as an image formed plane) is subsequently refracted by the triangular prism 80 and reflected by the mirror 81, the image being inverted thereby into an upright image, and directed to the user's eye through the eyepiece Gc.

In the finder F2 according to this embodiment, in order to adjust the indication ratio, the position of the triangular prism 80 is adjusted in the stage of assembly. As well known, the indication ratio is the proportion of a portion of the field of view of the finder F2 which portion coincides with the area taken by the taking zoom lens 2. To appropriately adjust the proportion, the image inverting optical system is held so that its element located in the rear of the vertical image formed plane 79b2 of the second prism 79b, i.e. the triangular prism 80 is movable in parallel with the vertical image formed plane 79b2, i.e. vertically to the incident optical axis. The indication ratio is adjusted by moving the triangular prism 80.

Specifically, in a front side wall 83c of the image inverting optical system mounting portion 83 on which the triangular prism 80 is fitted is formed a screw hole 101 with which a prism positioning screw 102 is engaged. Between the triangular prism 80 and a rear wall of the finder case 78 is provided a flat spring 103 which pushes the triangular prism 80 forward. The triangular prism 80 is held between the prism positioning screw 102 and the flat spring 103 by being pressed thereby. In assembly, to adjust the indication ratio, the insertion amount of the prism positioning screw 102 is adjusted to finely move the triangular prism 80 so that an indicator displayed in the finder field of the eyepiece optical system is set in a proper position.

In this case, when the insertion amount of the prism positioning screw 102 is adjusted, only the triangular prism 80 is moved so that the relative positional relationship with the mirror 18, which is stationary, changes slightly. However, since the area of the reflecting surface of the mirror 81 is sufficient for covering the effective surface of the triangular prism 80, no problem is caused in the inverting optical system.

The finder F2 according to this embodiment includes a field frame switching mechanism for switching the field of view of the finder F2 to the above-described first to third image sizes in response to the operation of the field frame switching lever 8. The field frame switching mechanism includes a driver 104 interlocking with the field frame switching lever 8 and a driven portion 105 for switching the field of view in the finder F2 in response to the movement of the driver 104. Reverting to FIG. 16, between the image formed plane 79b2 of the second prism 79b and the triangular prism 80, first and second field frame plates 106 and 107 of the driven portion 105 of the field frame switching mechanism are disposed so as to be movable in a direction perpendicular to the optical axis.

Since the image inverting optical system mounted in the finder case 78 is an assembly of three triangular prisms grouped into two units and the slanting mirror 81, a space Sa is left between the top surface of the body 1 and the slanting upper surface of the prism 79a (see FIG. 109). The driven portion 105 of the field frame switching mechanism is disposed between the Porro prism 79 and the triangular prism 80 as described later.

Figure 19:
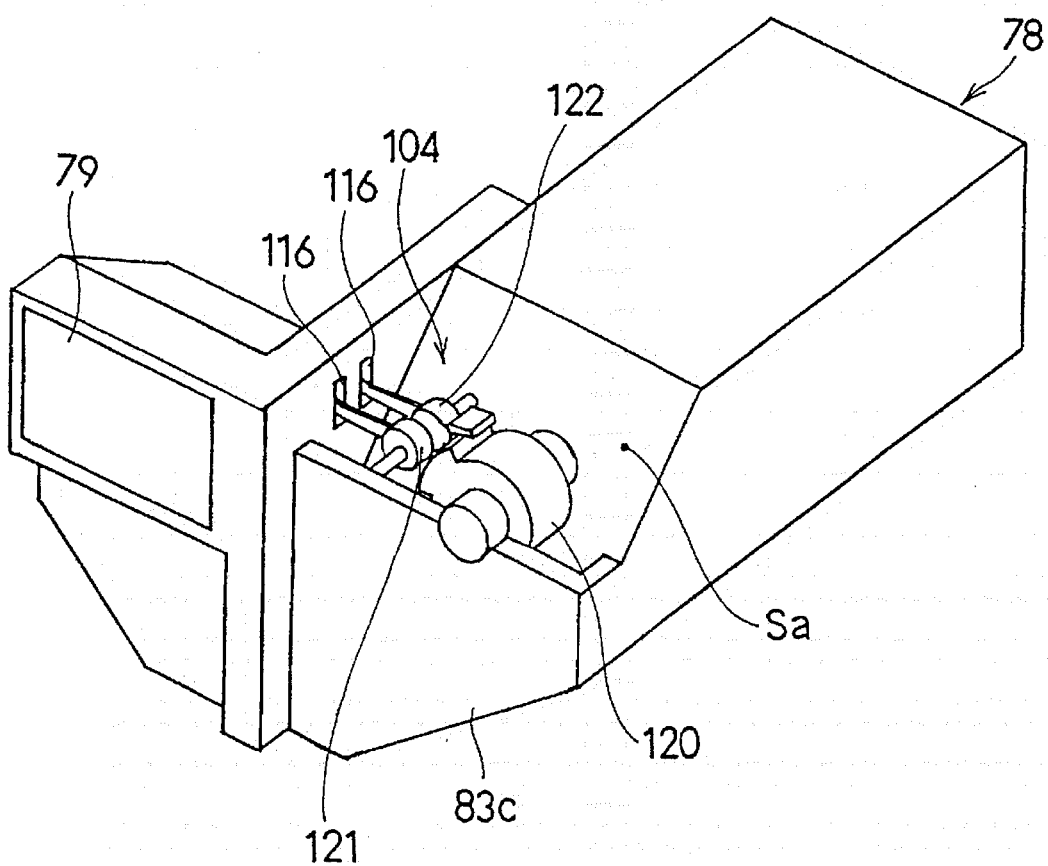
FIG. 19 is a perspective view schematically showing an attachment structure of a driver of the field frame switching mechanism.

In view of this structure, in this embodiment, the driver 104 is disposed by use of the space Sa. Specifically, as shown in FIG. 19, the driver 104 of the field frame switching mechanism is disposed within the space Sa above the mirror 81. The entire driven portion 105 is moved integrally with the triangular prism 80 in order to follow the indication ratio adjustment by the prism positioning screw 102, thereby preventing that the field frame shifts after the indication ratio adjustment. In addition, the image sizes other than the standard image size may be adjusted at the same time.

Figure 20:
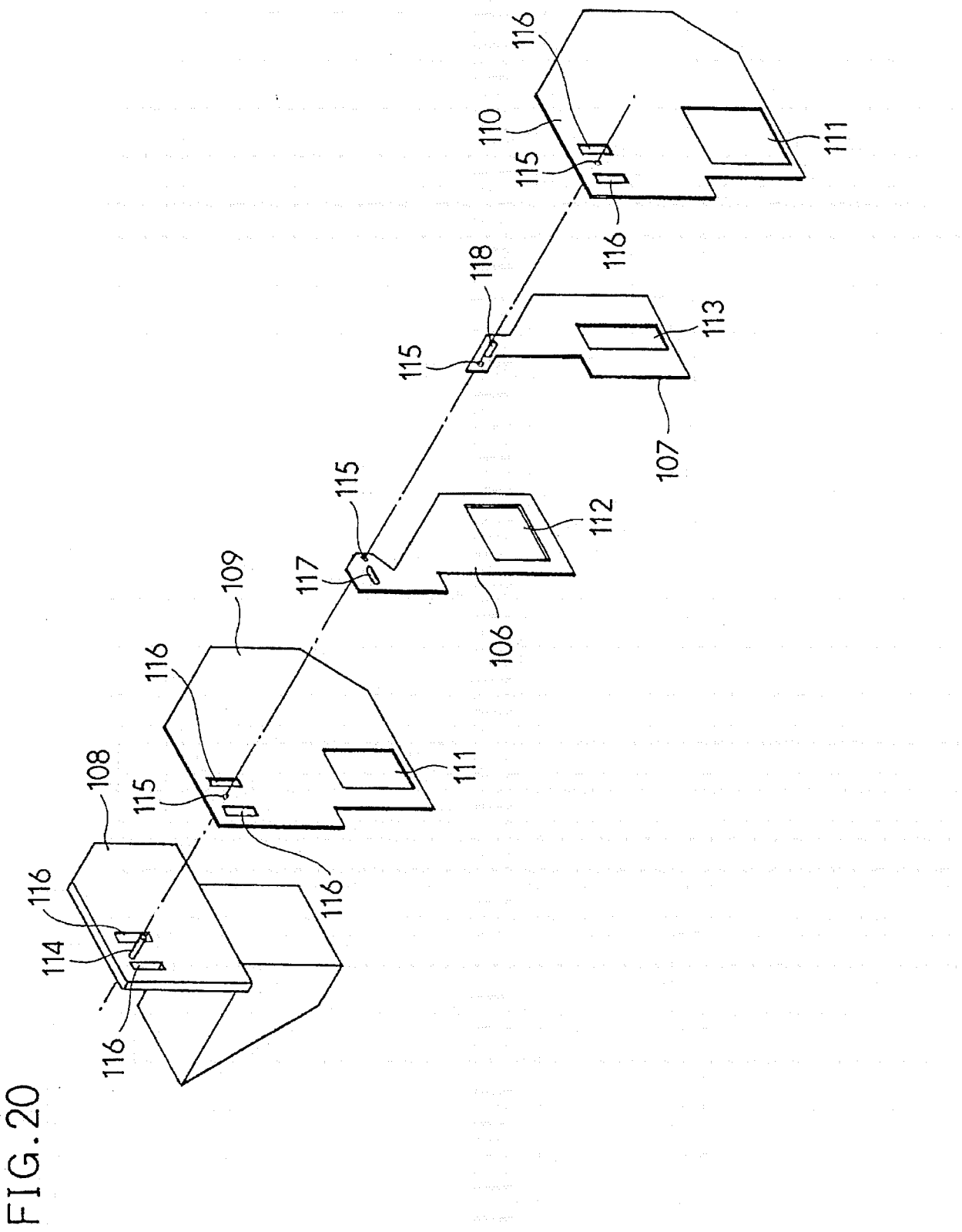
FIG. 20 is an exploded perspective view showing an attachment structure of field frame plates of the field frame switching mechanism.

FIG. 20 shows the attachment structure of the field frame plates 106 and 107. Numeral 108 represents a base plate secured to the second prism 79b of the Porro prism 79. Numerals 109 and 110 represent left and right stationary frame pieces as first and second members disposed to sandwich the first and second field frame plates 106 and 107. The base plate 108 may be formed integrally with the second prism 79b.

The left and right stationary frame pieces 109 and 110 each has, at their lower end portions facing the image formed plane 79b2 of the second prism 79b, a first field defining window 111 corresponding to the first image size H of FIG. 15 which is the standard size. The first field frame plate 106 has, at its lower end portion facing the first field defining window 111, a second field defining window 112 corresponding to the second image size C. Similarly, the second field frame plate 107 has, at its lower end portion, a third field defining window 113 corresponding to the third image size P.

The base plate 108 has a fulcrum pin 114 serving as a rotation fulcrum at an upper end of its surface facing the frame pieces 106, 107, 109 and 110. The first and second field frame plates 106 and 107 and the left and right stationary frame pieces 109 and 110 have pin holes 115. By engaging the pin holes 115 with the fulcrum pin 114, the frame pieces 106, 107, 109 and 110 are attached to the base plate 108. The left and right stationary frame pieces 109 and 110 are fixed by their outline portions being restricted by the inner dimension of the finder case 78. The first and second field frame plates 106 and 107 are supported so as to be pivotable about the fulcrum pin 114.

On both sides of the fulcrum pin 114 of the base plate 108 and on both sides of the pin holes 115 of the left and right stationary frame pieces 109 and 110, vertical rectangular holes 116 are formed for inserting first and second swing levers 126 and 127 (see FIG. 21) therethrough. The rectangular holes 116 have, with the swing levers 126 and 127 inserted therethrough, a sufficient width for allowing the driven portion 105 to move for the indication ratio adjustment.

In front of the pin hole 115 of the first field frame plate 106, a horizontal oblong hole 117 is formed for inserting the first swing lever 126 therethrough. In the rear of the pin hole 115 of the second field frame plate 107, a slanting oblong hole 118 is formed for inserting the second swing lever 127 therethrough.

Figure 21:
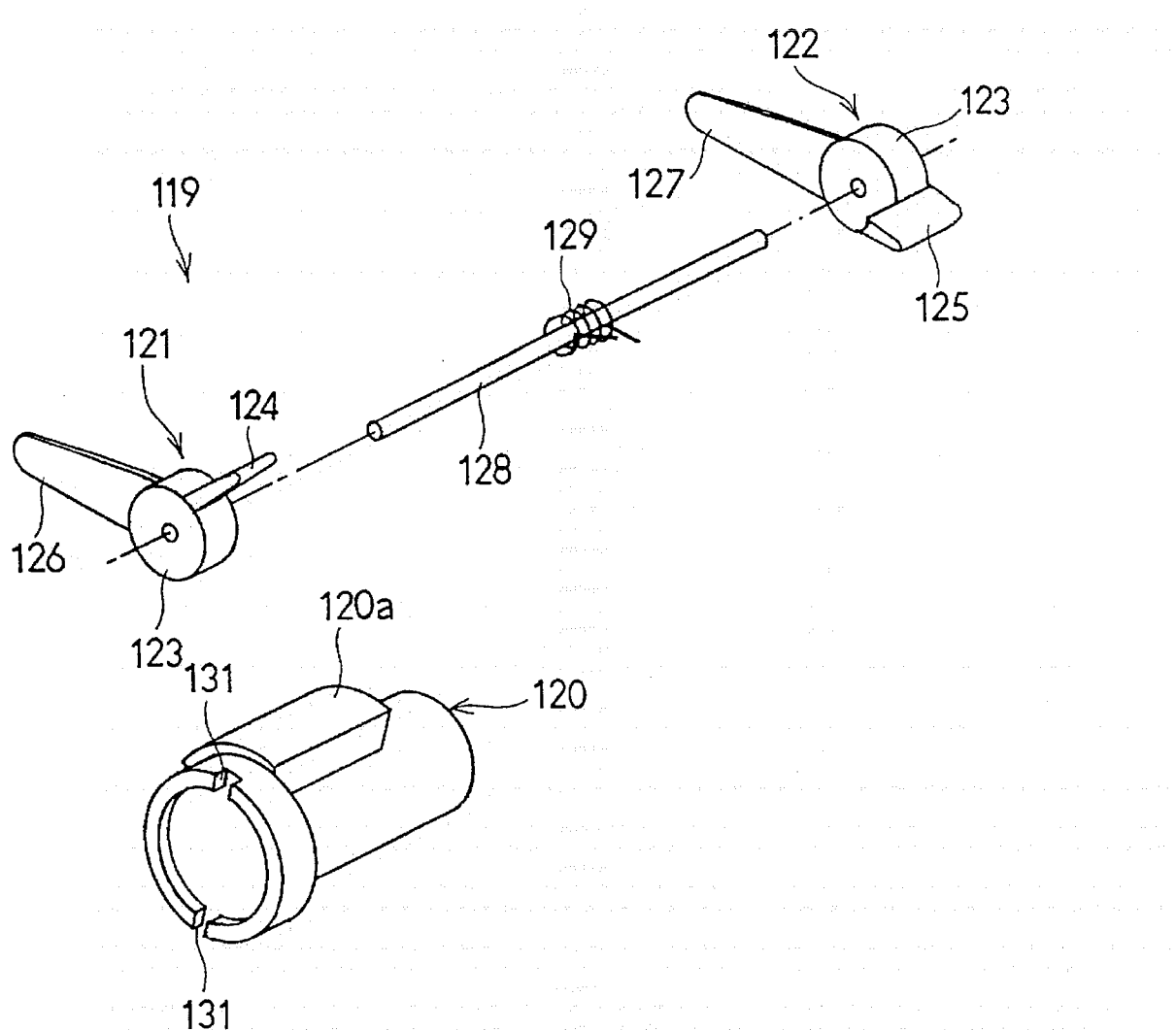
FIG. 21 is an exploded perspective view showing a structure of the driver of the field frame switching mechanism.
Figure 22:
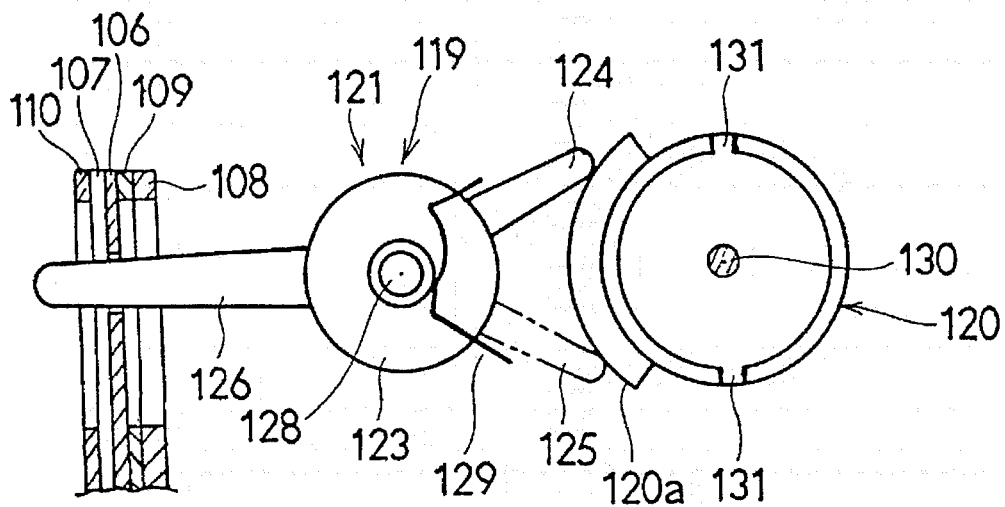
FIG. 22 is a partially cutaway side view showing an assembled condition of the field frame switching mechanism.

FIG. 21 shows the structure of the driver 104 of the field frame switching mechanism. FIG. 22 shows the assembled condition of the field frame switching mechanism. Numeral 119 represents a swing switching mechanism and numeral 120 represents a field frame switching cam as a cam member for activating the swing switching mechanism 119. The swing switching mechanism 119 has first and second swing members 121 and 122 as rotary levers. As the first and second swing members 121 and 122, parts of the same configuration are used. On bosses 123 of the swing members 121 and 122, cam followers 124 and 125 as arms in contact with a cam crest 120a of the field frame switching cam 120, and the swing levers 126 and 127 are integrally formed.

The bosses 123 of the swing members 121 and 122 are rotatably fitted on a common shaft 128 so as to be opposite to each other and the cam followers 124 and 125 are pushed by a click spring 129 fitted on the shaft 128 in a closing direction.

The swing lever 126 of the first swing member 121 is inserted through the front rectangular holes 116 of the base plate 108 and the left stationary field piece 109, the horizontal oblong hole 117 of the first field frame plate 106 and the front rectangular hole 116 of the right stationary frame piece 110. The swing lever 127 of the second swing member 122 is inserted through the rear rectangular holes 116 of the base plate 108 and the left stationary frame piece 109, the slanting oblong hole 118 of the second field frame plate 107 and the rear rectangular hole 116 of the right stationary frame piece 110. The levers 126 and 127 are pushed by the click spring 129 in a direction to move the first or second field frame plate 106 or 107 to a position where its field defining window 112 or 113 overlaps the first field defining window 111.

Thus, since the pushing direction of the click spring 129 is the same as the direction in which the plates 106 and 107 are moved into the field of view, the position shift of the plates 106 and 107 in the field of view can be completely prevented by simply providing a stopper means in an appropriate position.

The field frame switching cam 120 has a rotary shaft 130 in its center and has the cam crest 120a on its periphery. At an end of the cam 120 are provided recesses 131 as operated portions engaging with the field frame switching lever 8. The field frame switching cam 120 is rotatably disposed in a position opposite the swing switching mechanism 119 so that its periphery having the cam crest 120a is in contact with the cam followers 124 and 125 of the swing members 121 and 122.

Figure 23A:
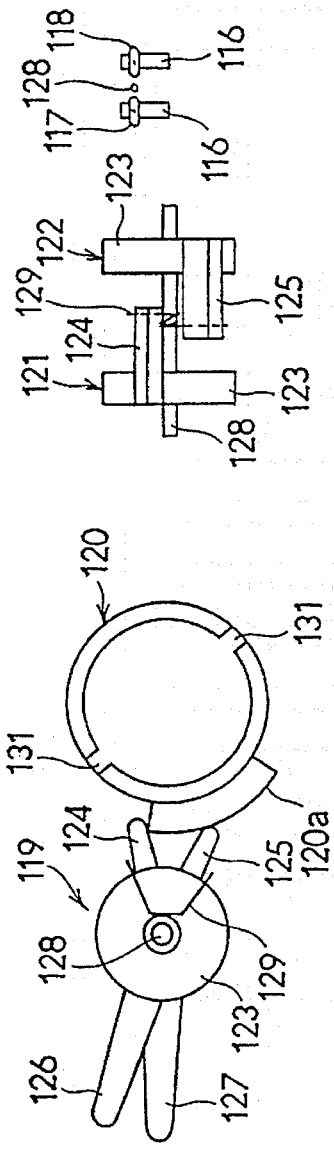
FIG. 23A shows a side view of the field frame switching mechanism (left), a front view of the field frame plates (center) and a front view of holes of the field frame plates (right) explaining an operation of the field frame switching mechanism in the second image size condition.
Figure 23B:
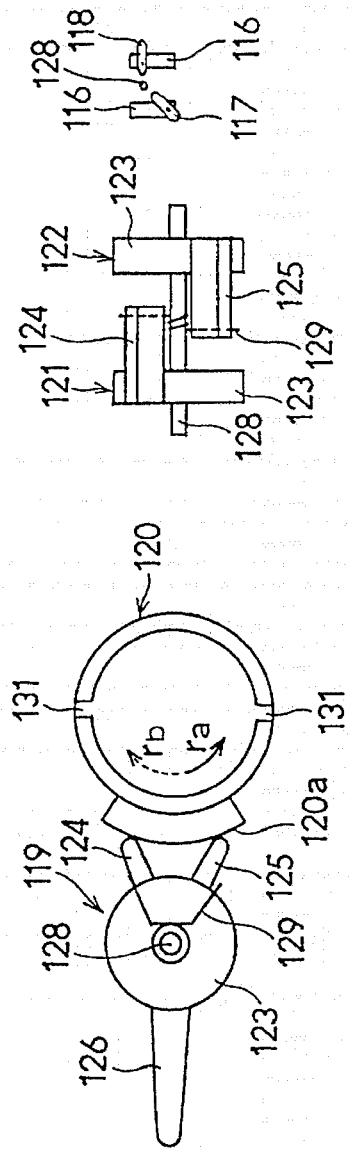
FIG. 23B shows a side view of the field frame switching mechanism (left), a front view of the field frame plates (center) and a front view of the holes of the field frame plates (right) explaining an operation of the field frame switching mechanism in the first image size condition.
Figure 23C:
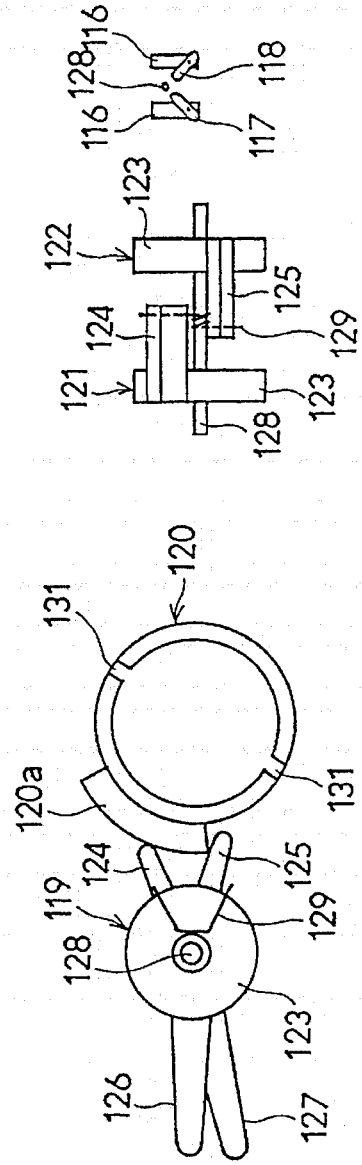
FIG. 23C shows a side view of the field frame switching mechanism (left), a front view of the field frame plates (center) and a front view of the holes of the field frame plates (right) explaining an operation of the field frame switching mechanism in the third image size condition.
Figure 24:
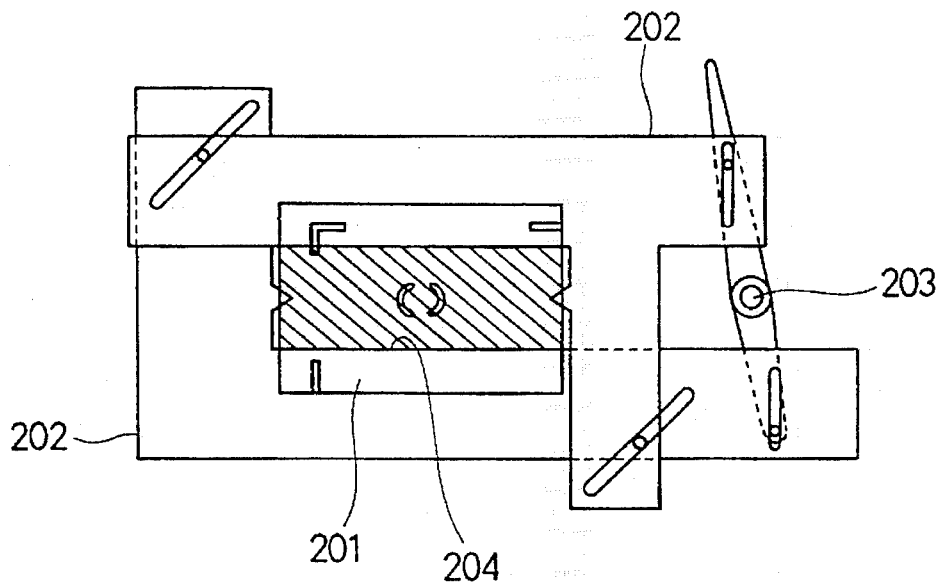
FIG. 24 is a front view of a prior art arrangement.
Figure 25:
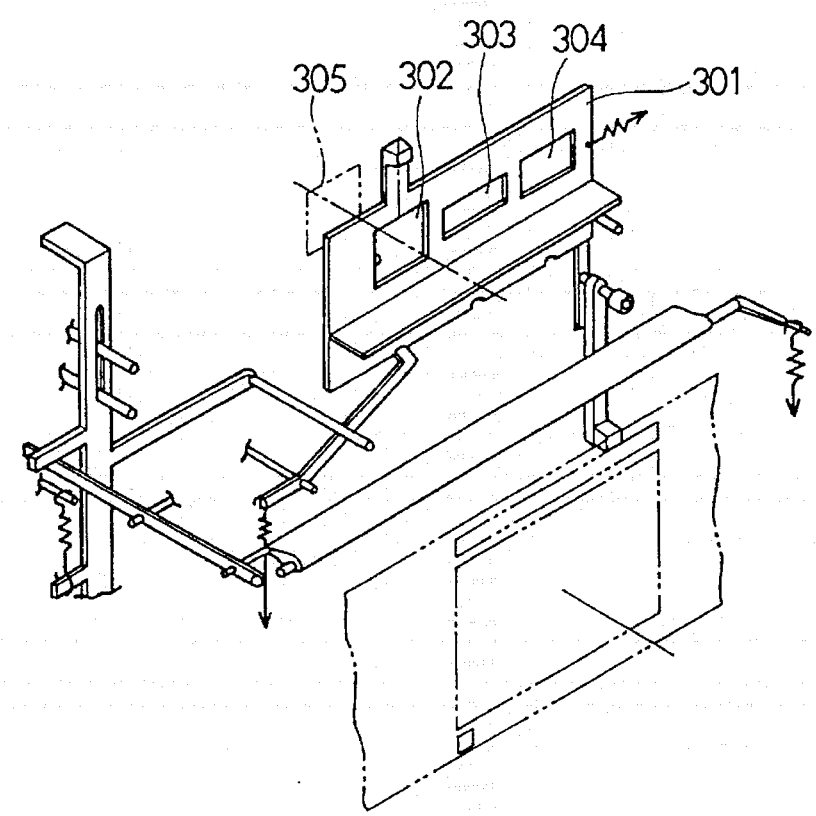
FIG. 25 is a perspective view of another prior art arrangement.

FIGS. 23A to 23C show an operation of the field frame switching mechanism. FIG. 23A shows a condition where the field frame switching lever 8 of FIG. 1B is set in the position of C to switch to the second image surface size. FIG. 23B shows a condition where the field frame switching lever 8 is set in the position of H to switch to the first image size which is the standard size. FIG. 23C shows a condition where the field frame switching lever 8 is set in the position of P to switch to the third image plane. In each figure, the left view is a side view of the field frame switching mechanism, the central view is a front view of the field frame switching pieces, and the right view shows the posture of the holes of the field frame plates viewed from the front.

In the standard size condition of FIG. 23B, the cam followers 124 and 125 of the first and second swing members 121 and 122 are both on the cam crest 120a of the field frame switching cam 120, so that the swing levers 126 and 127 of the members 121 and 122 are retracted against the pushing force of the click spring 129 to a position where the levers 126 and 127 overlap each other. In response to the retraction of the swing levers 126 and 127, the first and second field frame plates 106 and 107 are retracted to positions outside the field of view, so that the first field defining window of the base plate 108 and the left and right stationary frame pieces 109 and 110 is opened. As a result, the field of view of the ocular window 10 corresponds to the first image size H.

When the field frame switching lever 8 is switched to the position of C from the condition where the standard first image size H is set, the movement of the field frame switching lever 8 is transmitted to the recesses 131 to rotate the field frame switching cam 120 in a first direction shown by the solid arrow ra of FIG. 23B. Then, as shown in FIG. 23A, only the cam follower 124 of the first swing member 121 is separated from the cam crest 120a of the field frame switching cam 120 and the swing lever 126 of the first swing member 121 is rotated by being pushed by the click spring 129. In response to the return of the swing lever 126, the first field frame plate 106 is moved into the field of view, so that the second field defining window 112 overlaps the first field defining window 111. As a result, the field of view of the ocular window 10 corresponds to the second image size C.

When the field frame switching lever 8 is switched to the position of P from the condition where the first image size H is set, the movement of the field frame switching lever 8 is transmitted to the recesses 131 to rotate the field frame switching cam 120 in a second direction shown by the broken arrow rb of FIG. 23B. Then, as shown in FIG. 23C, only the cam follower 125 of the second swing member 122 is separated from the cam crest 120a of the field frame switching cam 120 and the swing lever 127 of the second swing member 122 is rotated by being pushed by the click spring 129. In response to the return of the swing lever 127, the second field frame plate 107 is moved into the field of view, so that the third field defining window 113 overlaps the first field defining window 111. As a result, the field of view of the ocular window 10 corresponds to the third image size P.

As described above, according to the present invention, in addition to a stationary frame plate disposed in an optical path, two rotatable frame plates each of which moves in the optical pass to overlap with the stationary frame plate are provided to define three fields of view of different sizes. Since the movement of the rotatable frame plates is controlled by a single cam member and the frame plates substantially overlap with each other when they are at their retracted positions, the field-of-view frame switching mechanism has a simple structure and is effectively prevented from increasing in size. Moreover, each of the fields of view is defined by a single frame plate so that the field-of-view ratio never varies and adjustment of indication ratio can be performed very easily.

Obviously, many modifications and variations of the present invention are possible in light of the above teachings. It is therefore to be understood that within the scope of the appended claims, the invention may be practiced other than as specifically described.

What is claimed is:

1. A field-of-view frame switching mechanism comprising:

a stationary field-of-view frame piece disposed in an optical path;

a first movable field-of-view frame piece;

a second movable field-of-view frame piece;

a switching cam having a cam piece and being movable in a first direction and a second direction;

a first rotary lever connected to said first movable field-of-view frame piece and having an arm engaged with the cam piece of said switching cam; and a second rotary lever connected to said second movable filed-of-view frame piece and having an arm engaged with the cam piece of said switching cam, wherein, when said switching cam is moved in the first direction, the arm of said first rotary lever is disengaged from said cam piece, so that said first rotary lever rotates to drive said first movable field-of-view frame piece to overlap with the stationary field-of-view frame piece, and wherein, when said switching cam is moved in the second direction, the arm of said second rotary lever is disengaged from said cam piece, so that said second rotary lever rotates to drive said second movable field-of-view frame piece to overlap with the stationary field-of-view frame piece.

2. A field-of-view frame switching mechanism as claimed in claim 1, wherein said switching cam has a rotary shaft and rotates in opposite directions around the rotary shaft.

3. A field-of-view frame switching mechanism as claimed in claim 2, wherein a rotatable member which is operated manually and transmits a rotation to said switching cam is provided.

4. A field-of-view frame switching mechanism as claimed in claim 1, wherein said first and second movable field-of-view frame pieces are supported by a same shaft so as to rotate coaxially, and disposed to substantially overlap with each other when said switching cam is not rotated in the first direction nor in the second direction.

5. A field-of-view frame switching mechanism as claimed in claim 1, wherein a spring is provided that presses said first and second rotary levers in a direction in which said first and second field-of-view frame pieces are driven to overlap with the stationary field-of-view frame piece.

6. A field-of-view frame switching mechanism as claimed in claim 1, wherein said first and second rotary levers are composed of members having a same shape.

\* \* \* \* \*